(12) United States Patent
Kaneuchi et al.

(10) Patent No.: US 8,581,949 B2
(45) Date of Patent: Nov. 12, 2013

(54) LASER MARKING METHOD

(75) Inventors: Yasuomi Kaneuchi, Yokohama (JP);
Motoki Kakui, Yokohama (JP); Kazuo Nakamae, Yokohama (JP); Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 407 days.

(21) Appl. No.: 12/536,780

(22) Filed: Aug. 6, 2009

(65) Prior Publication Data
US 2010/0033548 A1 Feb. 11, 2010

(30) Foreign Application Priority Data

Aug. 11, 2008 (JP) ................. P2008-207114

(51) Int. Cl.
*B41J 2/435* (2006.01)
(52) U.S. Cl.
USPC ........................................... 347/224
(58) Field of Classification Search
USPC .......... 347/144, 224, 225, 239, 240, 251–255
See application file for complete search history.

(56) References Cited

U.S. PATENT DOCUMENTS

| | | | |
|---|---|---|---|
| 5,056,042 A * | 10/1991 | Lieb ............................. | 347/144 |
| 6,207,344 B1 | 3/2001 | Ramlow et al. | |
| 6,831,768 B1 * | 12/2004 | Cebuhar et al. ................ | 359/291 |
| 7,469,081 B2 * | 12/2008 | Byer et al. ....................... | 385/27 |
| 7,705,268 B2 * | 4/2010 | Gu et al. ................... | 219/121.69 |
| 2004/0188399 A1 * | 9/2004 | Smart ..................... | 219/121.69 |

FOREIGN PATENT DOCUMENTS

| | | |
|---|---|---|
| JP | 2003-510416 | 3/2003 |
| JP | 2003-536266 A | 12/2003 |
| JP | 2006-045211 A | 2/2006 |
| JP | 2006-083242 A | 3/2006 |
| JP | 2007-503124 A | 2/2007 |
| JP | 2007-306944 A | 11/2007 |
| JP | 2008-160147 A | 7/2008 |
| JP | 2008/532323 A | 8/2008 |
| JP | 2009-066625 A | 4/2009 |
| WO | WO-2008/034036 A2 | 3/2008 |

OTHER PUBLICATIONS

Office Action in Japanese Patent Application No. 2009-181634 dated Jul. 9, 2013.

* cited by examiner

*Primary Examiner* — Hai C Pham
(74) *Attorney, Agent, or Firm* — Venable LLP; Michael A. Sartori; Tamatane J. Aga

(57) ABSTRACT

The present invention relates to a laser marking method which is capable of changing the grey level of a marking even in the case of a high processing speed. The laser marking method forms a marking pattern on a marking object by irradiating the marking object with pulsed light oscillated from a pulsed light source of a MOPA structure in which a semiconductor laser outputting directly-modulated pulsed light is used as a seed light source. At this time, the pulse duration of the pulsed light is changed in order to change a gray level of the marking pattern to be formed. In this way, a peak power of the pulsed light is changed by changing the pulse duration, so that it is possible to positively change the gray level of the marking pattern without changing the processing speed.

8 Claims, 23 Drawing Sheets

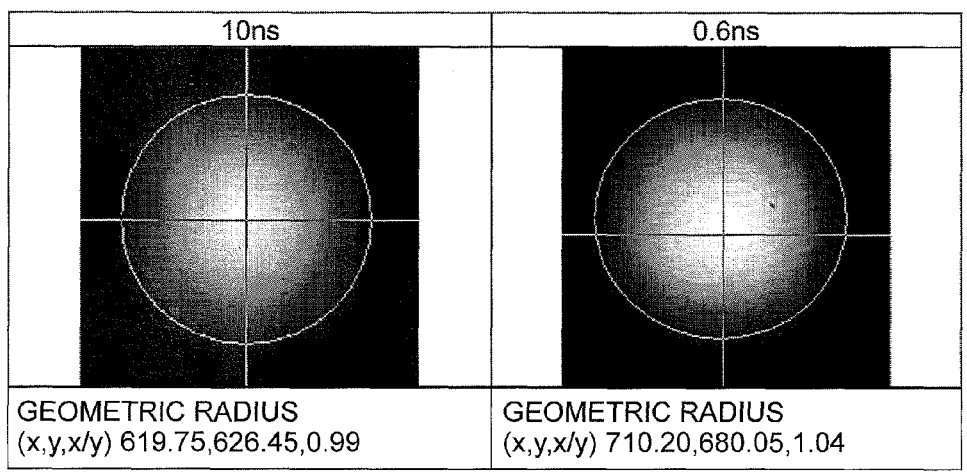

PULSE DURATION: 11ns
PEAK POWER: 0.63kW

PULSE DURATION: 12ns
PEAK POWER: 0.35kW

PULSE DURATION: 10ns
PEAK POWER: 0.17kW

PULSE DURATION: 10ns
PEAK POWER: 0.14kW

PULSE DURATION: 10ns
PEAK POWER: 1.36kW

PULSE DURATION: 10ns
PEAK POWER: 0.69kW

PULSE DURATION: 10ns
PEAK POWER: 0.34kW

PULSE DURATION: 10ns
PEAK POWER: 0.17kW

PULSE DURATION: 9ns
PEAK POWER: 8.10kW

PULSE DURATION: 9ns
PEAK POWER: 4.00kW

PULSE DURATION: 9ns
PEAK POWER: 1.76kW

PULSE DURATION: 10ns
PEAK POWER: 0.58kW

PULSE DURATION: 0.5ns
PEAK POWER: 7.98kW

PULSE DURATION: 0.5ns
PEAK POWER: 5.26kW

PULSE DURATION: 0.6ns
PEAK POWER: 2.52kW

PULSE DURATION: 0.6ns
PEAK POWER: 0.81kW

PULSE DURATION : 0.6ns
PEAK POWER : 17.03kW

PULSE DURATION : 0.4ns
PEAK POWER : 10.64kW

PULSE DURATION : 0.5ns
PEAK POWER : 6.50kW

PULSE DURATION : 0.6ns
PEAK POWER : 2.60kW

PULSE DURATION: 0.6ns
PEAK POWER: 21.28kW

PULSE DURATION: 0.5ns
PEAK POWER: 15.46kW

PULSE DURATION: 0.5ns
PEAK POWER: 9.20kW

PULSE DURATION: 0.6ns
PEAK POWER: 5.15kW

LASER MARKING METHOD

BACKGROUND OF THE INVENTION

1. Field of the Invention

The present invention relates to a laser marking method for forming a marking on the surface of an object by irradiating a pulsed laser light.

2. Related Background Art

As one of applications of a laser processing, there is a laser marking method of irradiating a marking object with a laser light emitted from a pulse light source. The laser marking method is capable of precisely performing non-contact printing with respect to various materials and is hence widely used for industrial products made of resin, glass, and the like. An example of such a laser marking method is disclosed, for example, in National Publication of International Patent Application No. 2003-510416 (Patent Document 1).

SUMMARY OF THE INVENTION

The present inventors have examined the conventional laser marking method, and as a result, have discovered the following problems. That is, in the conventional laser marking method disclosed in Patent Document 1, the laser marking can be performed by carbonization, sublimation, discoloration, foaming and engraving, but the variation in marking expression is not considered at all. Thus, the present inventors propose a method of changing the gray level of a marking pattern to be formed on a marking object, as one of the methods to expand the variation of expression by the laser marking.

However, in order to change the gray level of the marking pattern, it is necessary to change the peak power value of the pulsed light. On the other hand, when an industrial product or the like is to be marked as described above, it is desired to perform the laser marking at as high speed as possible.

As a method of increasing marking speed (defined by a length of a marking pattern formed on a marking object per a unit time and hereinafter referred to as processing speed) in the laser marking performed by pulsed light emitted from a pulsed light source, there are listed a method of increasing the relative moving speed of the pulsed light with respect to the marking object, a method of increasing the oscillation frequency of the pulsed light, and the like. However, in the case where the relative moving speed of the pulsed light with respect to the marking object is increased, when the pulse oscillation frequency is not sufficiently high, a marking is formed like a dot on the marking object. On the other hand, when the pulse oscillation frequency is increased, the average output power of the pulsed light source is reduced, so that the pulse energy and the peak power value of the pulsed light are reduced. Further, the average output power of the pulsed light source can also be increased in order to increase the peak power value, but thereby, defective color development, and the like, may be caused due to the thermal effect. In this way, in the state of high laser marking processing speed, it has been difficult to control the peak power value of the pulsed light and to change the gray level of a marking.

The present invention has been developed to eliminate the problems described above. It is an object of the present invention to provide a laser marking method in which the gray level of a marking pattern to be formed on a marking object can be changed even in the case where the laser marking processing speed is high.

The present invention relates to a laser marking method of forming a marking pattern on a marking object by irradiating the marking object with pulsed light oscillated from a pulsed light source of a MOPA (Master Oscillator and Power Amplifier) structure in which a semiconductor laser outputting directly-modulated pulsed light is used as a seed light source. Particularly, in order to achieve the above described object, in the laser marking method according to the present invention, the gray level of the marking pattern to be formed on the marking object is changed by changing the pulse duration of the pulsed light outputted from the pulsed light source.

In accordance with the laser marking method according to the present invention, the gray level of the marking pattern to be formed on the marking object as described above is changed by positively changing the pulse duration. By changing the pulse duration in this way, the peak power value of the pulsed light is changed. Therefore, it is possible to change the gray level of the marking pattern without changing the processing speed. Further, when the pulsed light source of the MOPA structure is used, it is possible to realize the increase in the repetition frequency, the reduction in the pulse duration, and the increase in the peak power value of the pulsed light. For this reason, even when the relative moving speed of the pulsed light with respect to the marking object is high, it is possible to arbitrarily set the gray level of the marking pattern to be formed on the marking object.

Note that in the laser marking method according to the present invention, the pulse duration is changed in correspondence with the repetition frequency of the pulsed light outputted from the pulsed light source. Further, the pulse duration may also be changed in correspondence not only with the repetition frequency but also with a combination of the relative moving speed of the pulsed light with respect to the marking object and the repetition frequency. In this case, it is possible to select a more suitable pulse duration according to the combination of the relative moving speed and the repetition frequency. Thus, even when the processing speed is high, it is possible to more surely change the gray level of the marking pattern.

Further, there are various modes of the laser marking (for forming a desired marking pattern in a marking object) by the laser marking method according to the present invention.

For example, in a first aspect of the laser marking, a linear shape is formed on the surface of a marking object by processing using pulsed light with a first pulse duration, and then, processing using pulsed light with a second pulse duration different from the first pulse duration is further performed on the line which is formed on the surface of the marking object by the processing using the pulsed light with the first pulse duration. In this case, by performing the processing on the same line by using the pulsed light components with different pulse durations, it is possible to arbitrarily set the gray level of the linear marking pattern.

Further, in a second aspect of the laser marking, a linear shape is formed on the surface of a marking object by processing using pulsed light with a first pulse duration, and then the vicinity of the line, which is formed on the surface of the marking object by the processing using the pulsed light having the first pulse duration, is further processed by using pulsed light with a second pulse duration different from the first pulse duration. In this case, it is possible to form a plurality of marking patterns having different gray levels on the whole surface of the marking object.

Further, in a third aspect of the laser marking, a two dimensional pattern is created as a marking pattern on the surface of a marking object. Specifically, in the third mode, a first marking area is created on the surface of a marking object by performing a plurality of times of linear processing which uses pulsed light with a first pulse duration, and a second marking area is further created by performing a plurality of times of linear processing, which uses pulsed light with a second pulse duration different from the first pulse duration, with respect to the area on the surface of the marking object, which area is different from the first marking area.

BRIEF DESCRIPTION OF THE DRAWINGS

FIGS. 3A and 3B are views each showing a beam cross section at the time when pulsed light is emitted from the pulsed light source;

DESCRIPTION OF THE PREFERRED EMBODIMENTS

Figure 1:
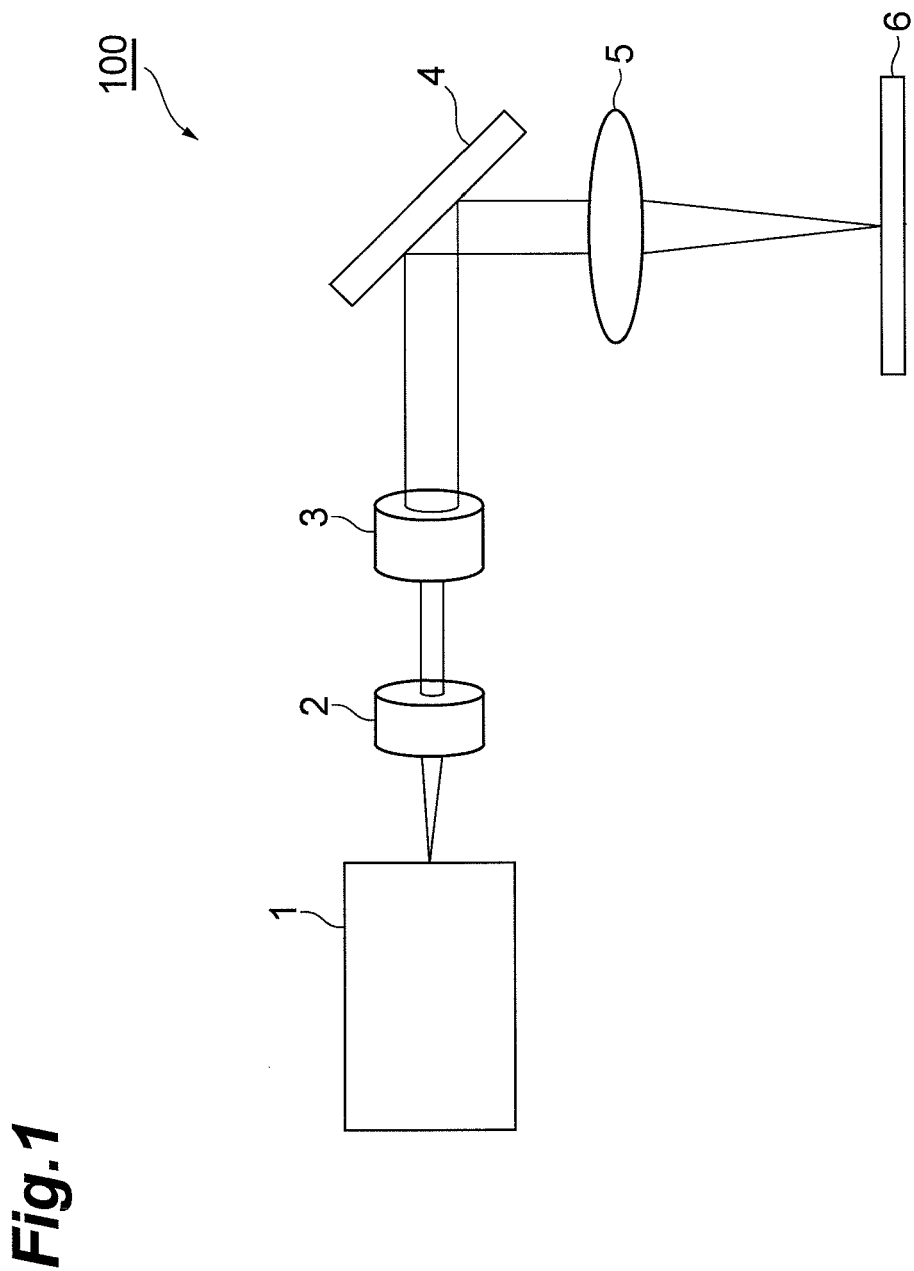
FIG. 1 is a view showing a configuration example of a laser processing apparatus for implementing an embodiment of a laser marking method according to the present invention.

In the following, embodiments of a laser marking method according to the present invention will be described in detail with respect to Figs. FIGS. 1 to 2, 3A to 19C, and 20 to 23. In the description of the drawings, identical or corresponding components are designated by the same reference numerals, and overlapping description is omitted.

First, a configuration example of a laser processing apparatus for implementing an embodiment of a laser marking method according to the present invention will be described with reference to FIG. 1.

That is, a laser processing apparatus 100 shown in FIG. 1 is configured by a pulsed light source 1, a collimator 2, a beam expander 3, a galvano scanner 4, and an fθ lens 5. When pulsed light outputted from the laser processing apparatus 100 is irradiated onto a marking object 6, the surface of the marking object 6 is processed (and a desired marking pattern is formed on the surface of the marking object 6).

The pulsed light source 1 is a light source from which pulsed light is pulse-oscillated. The pulsed light source 1 outputs the pulsed light with a wavelength near 1060 nm which is suitable for laser marking. Further, the maximum output power of the pulsed light source 1 is about 10 W. Further, the repetition frequency of the pulsed light can be varied from 50 kHz to 1 MHz, and the pulse duration (half-value duration to the peak power) of the pulsed light can be adjusted to a range of 9 to 12 ns, or a range of 0.4 to 0.6 ns.

The collimator 2 receives the pulsed light outputted from the pulsed light source 1, and converts the received pulsed light into a parallel light, so as to output the parallel light toward the beam expander 3. The beam expander 3 receives the pulsed light outputted from the collimator 2, so as to expand the beam diameter of the pulsed light, and then outputs the pulsed light with the expanded beam diameter toward the galvano scanner 4. The galvano scanner 4 reflects the pulsed light outputted from the beam expander 3, so as to output the reflected pulsed light in the direction in which the marking object 6 is arranged. At this time, the galvano scanner 4 scans the pulsed light with respect to the marking object 6. Further, the fθ lens 5 vertically condenses the pulsed light outputted from the galvano scanner 4 onto the surface of the marking object 6.

Note that the laser processing apparatus 100 comprises a structure which makes the pulsed light relatively move with respect to the marking object 6 by utilizing the galvano scanner 4 as described above, but may also comprise a structure in which the marking object 6 itself is moved in the state where the irradiation position of the pulsed light is fixed.

Figure 2:
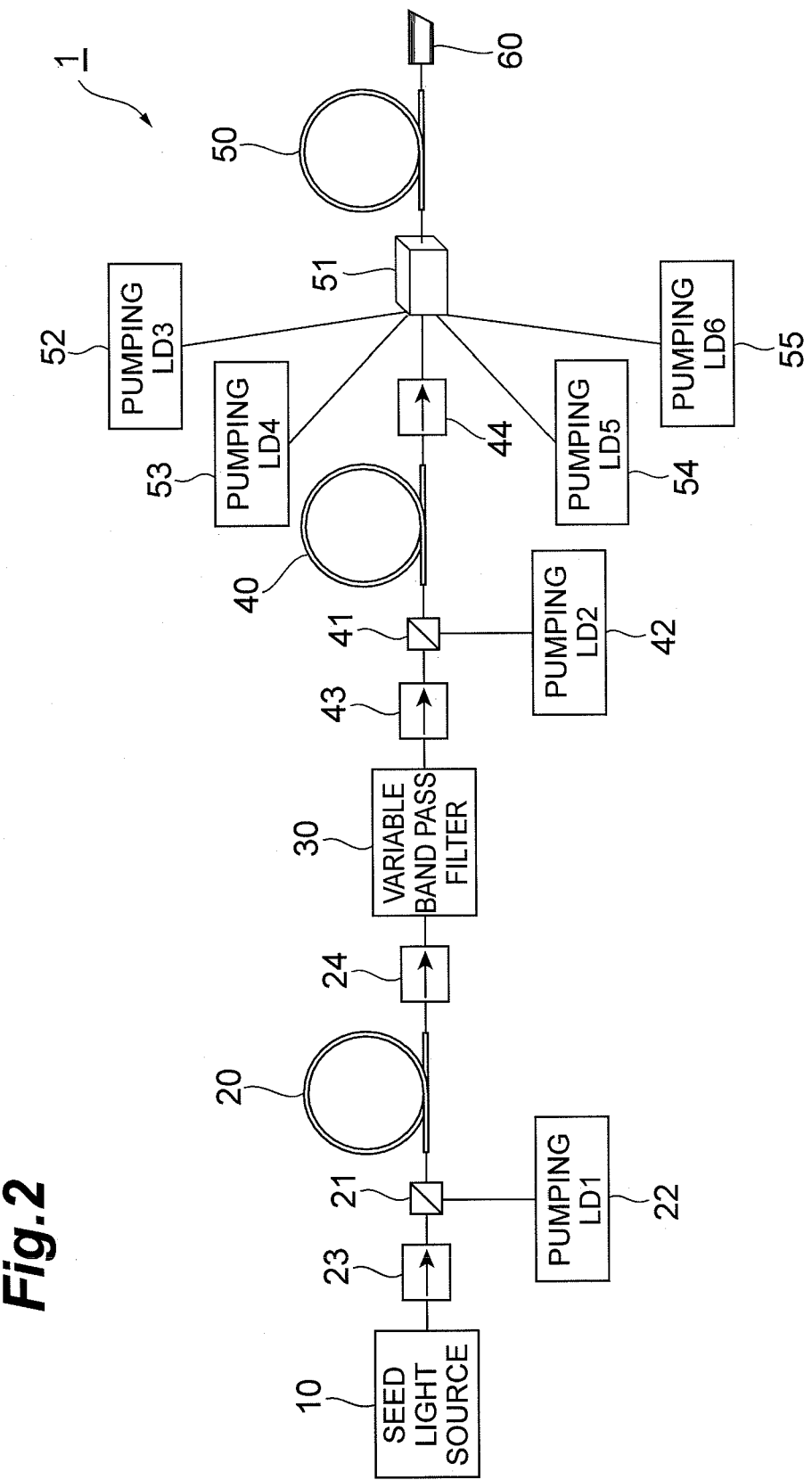
FIG. 2 is a view showing a configuration example of a pulsed light source in the laser processing apparatus shown in FIG. 1.
Figure 4A:
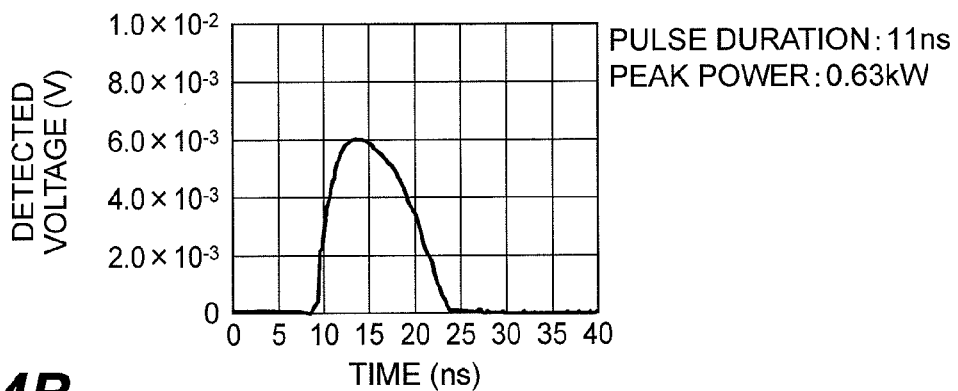
FIGS. 4A to 4D are views each showing a measurement result of a pulse waveform in the case where pulsed light (having a pulse duration of 9 to 12 ns and a repetition frequency of 1 MHz) is oscillated from the pulsed light source.
Figure 4B:
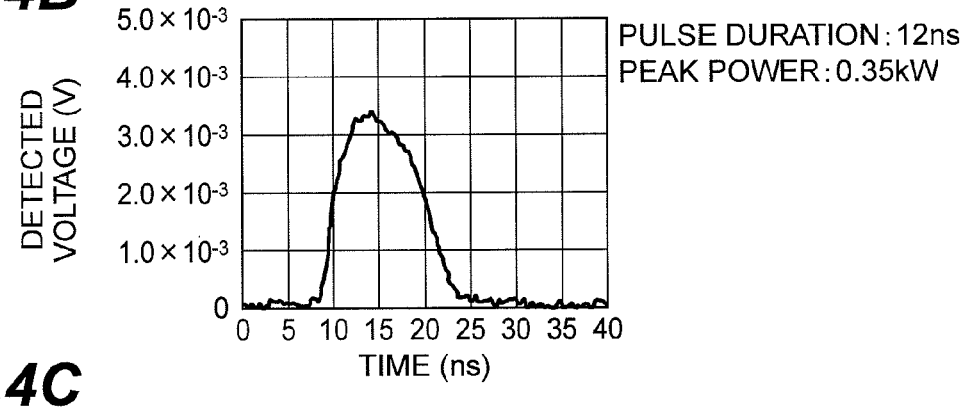
Figure 4C:
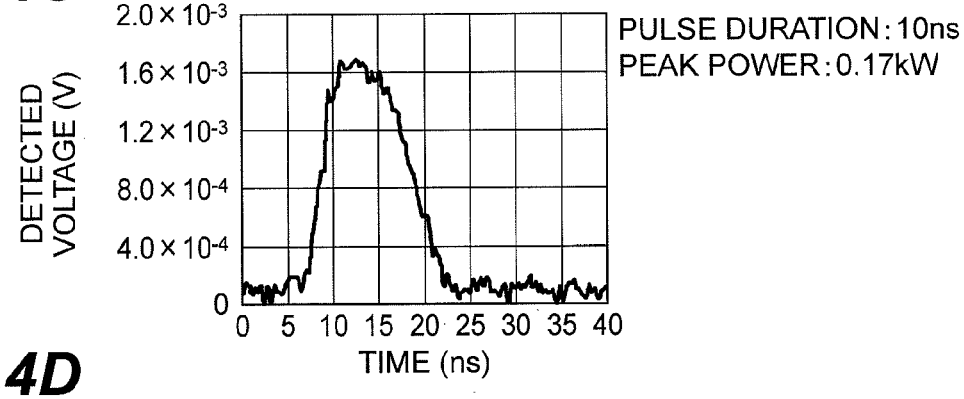
Figure 4D:
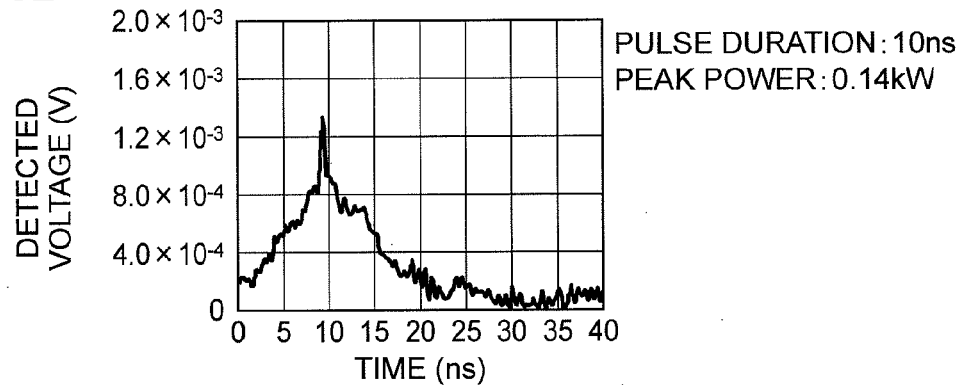
Figure 5A:
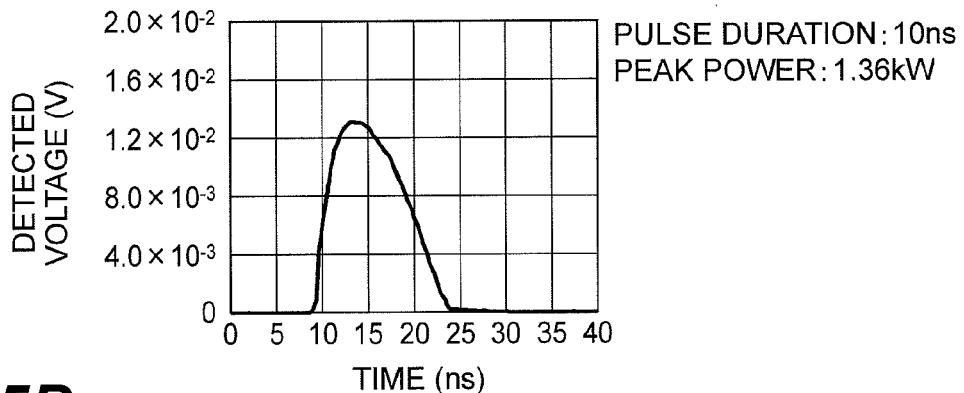
FIGS. 5A to 5D are views each showing a measurement result of a pulse waveform in the case where pulsed light (having a pulse duration of 9 to 12 ns and a repetition frequency of 500 kHz) is oscillated from the pulsed light source.
Figure 5B:
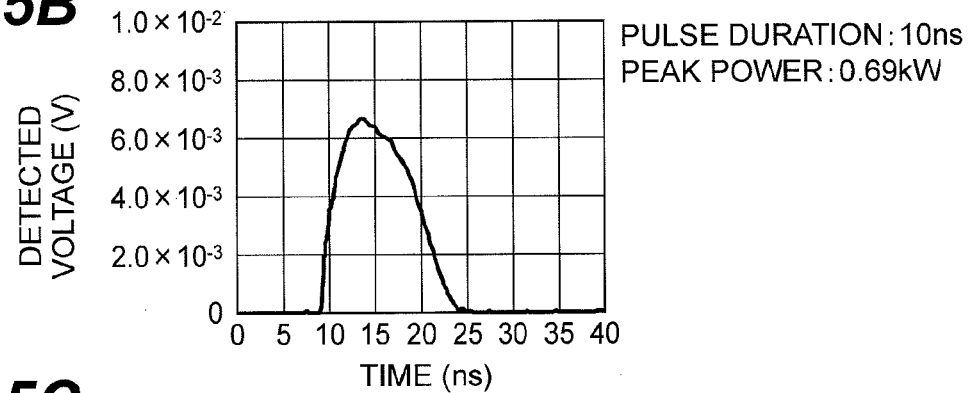
Figure 5C:
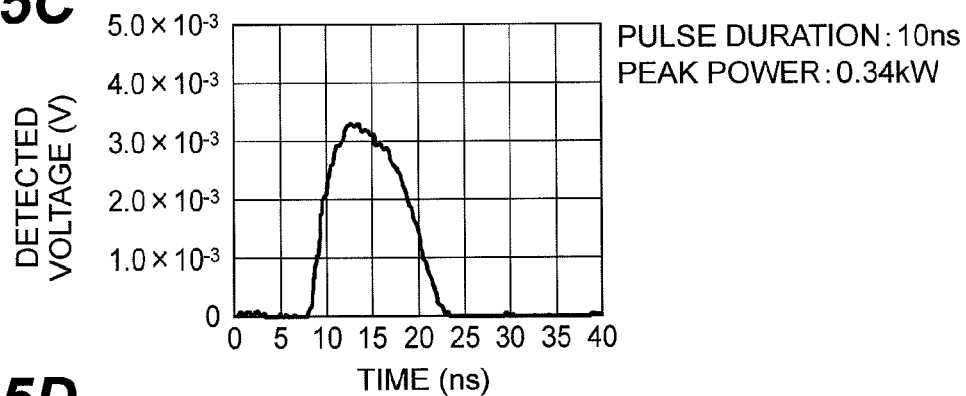
Figure 5D:
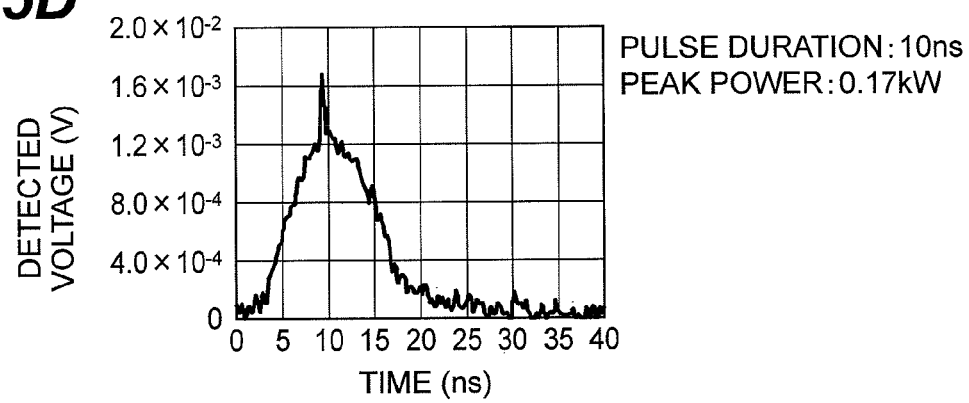
Figure 6A:
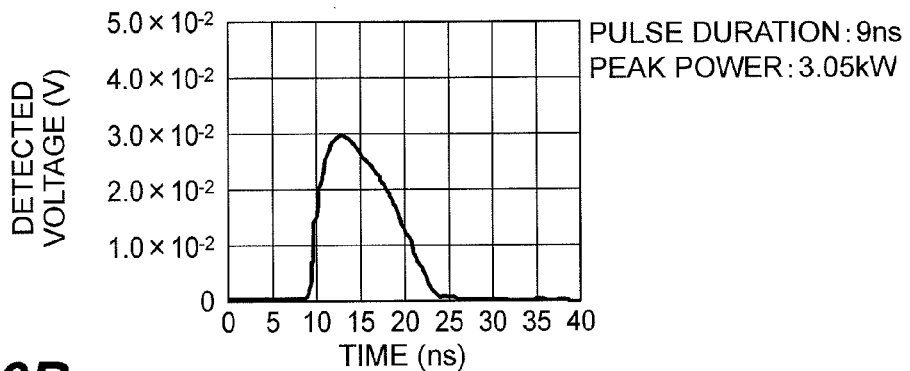
FIGS. 6A to 6D are views each showing a measurement result of a pulse waveform in the case where pulsed light (having a pulse duration of 9 to 12 ns and a repetition frequency of 250 kHz) is oscillated from the pulsed light source.
Figure 6B:
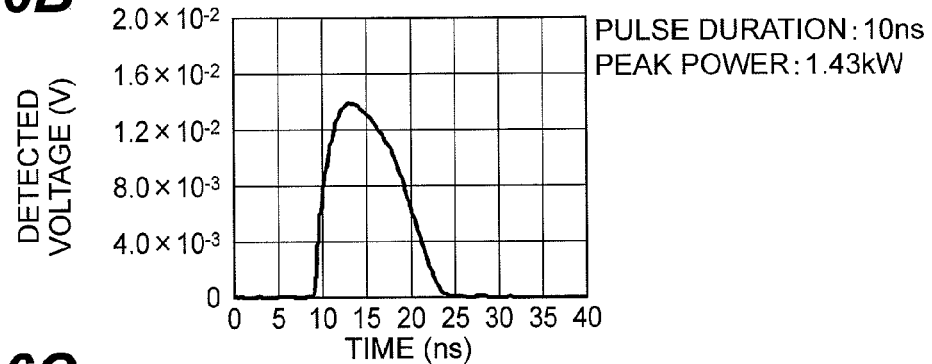
Figure 6C:
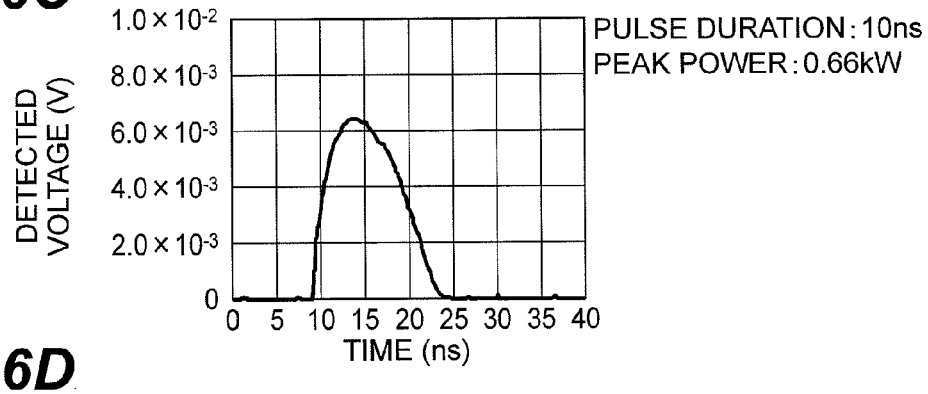
Figure 6D:
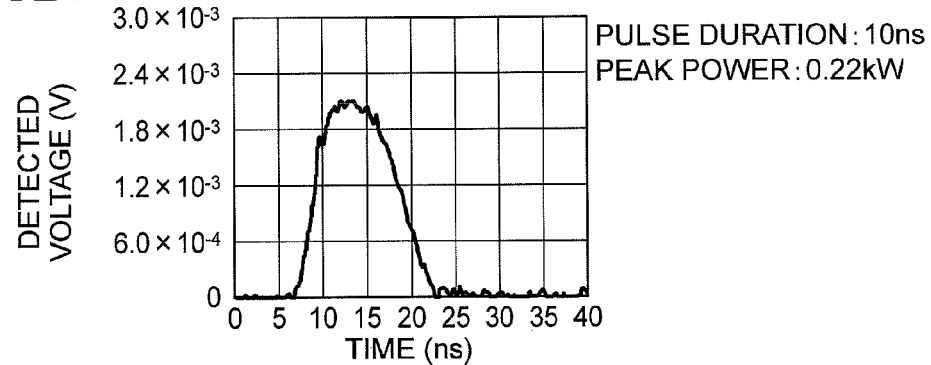
Figure 7A:
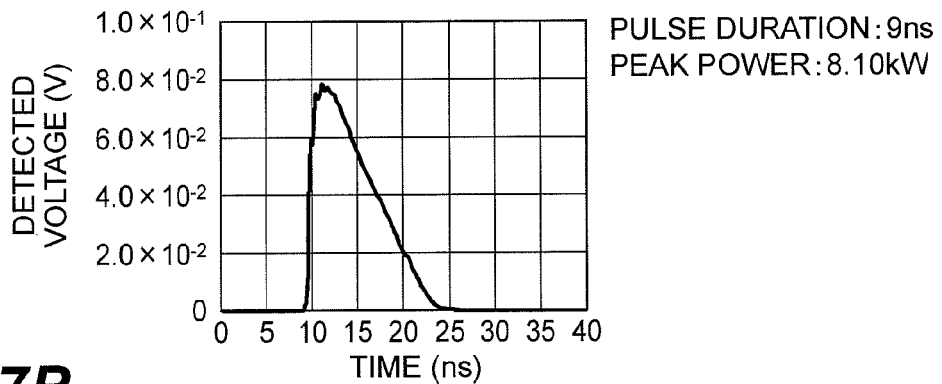
FIGS. 7A to 7D are views each showing a measurement result of a pulse waveform in the case where pulsed light (having a pulse duration of 9 to 12 ns and a repetition frequency of 100 kHz) is oscillated from the pulsed light source.
Figure 7B:
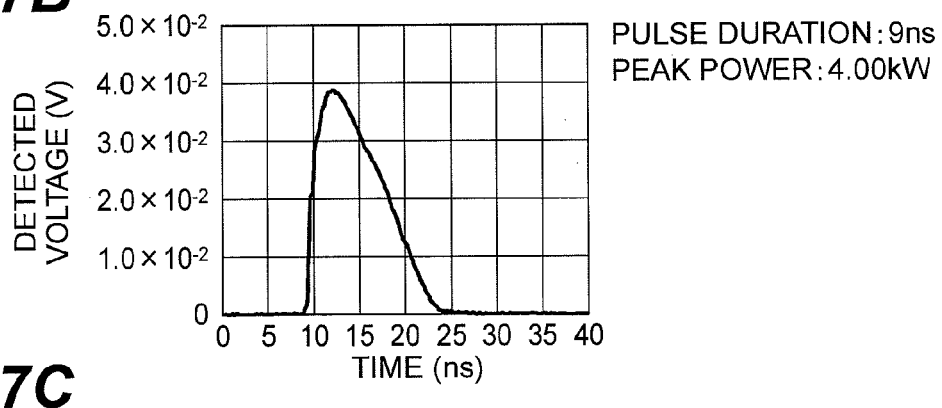
Figure 7C:
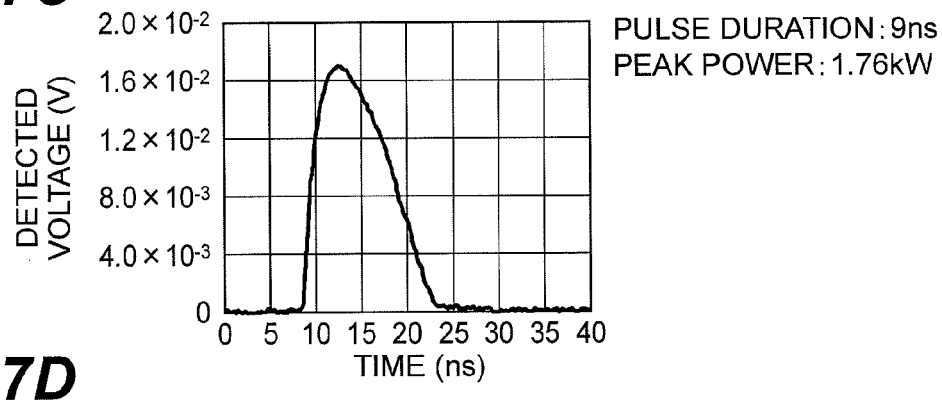
Figure 7D:
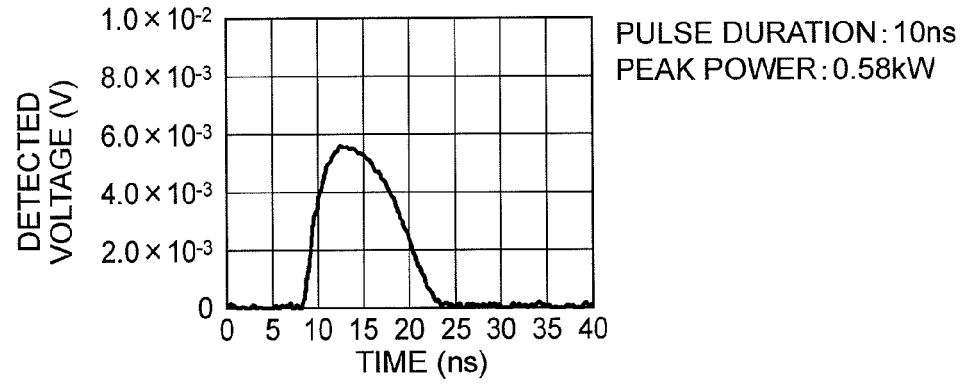
Figure 8A:
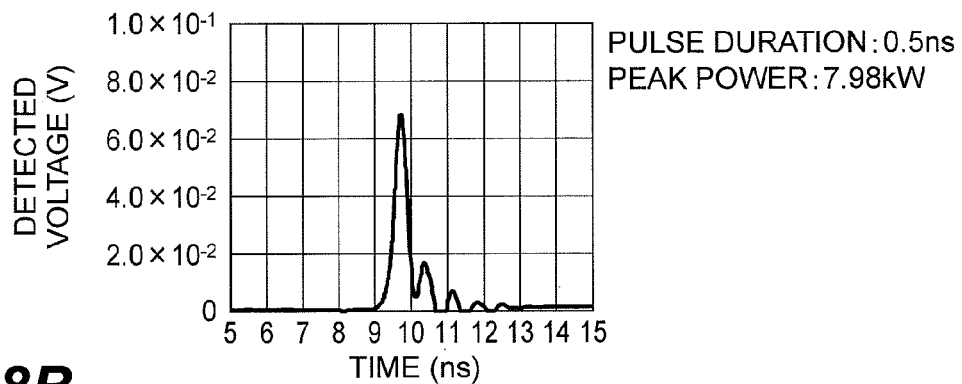
FIGS. 8A to 8D are views each showing a measurement result of a pulse waveform in the case where pulsed light (having a pulse duration of 0.4 to 0.6 ns and a repetition frequency of 1 MHz) is oscillated from the pulsed light source.
Figure 8B:
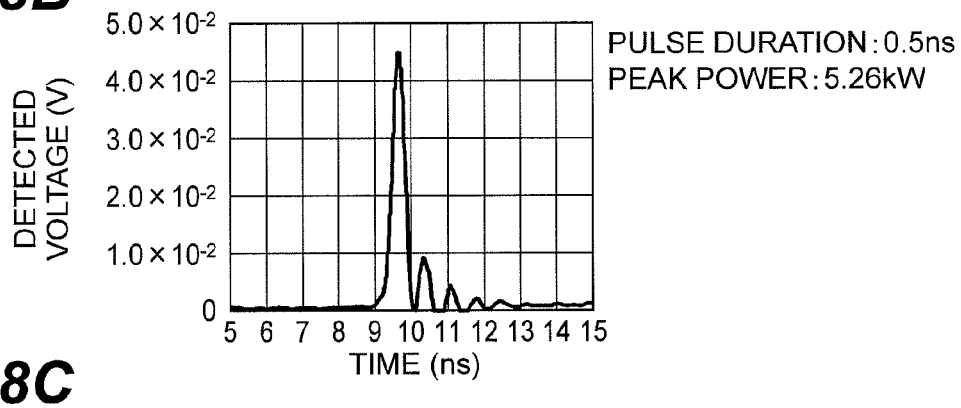
Figure 8C:
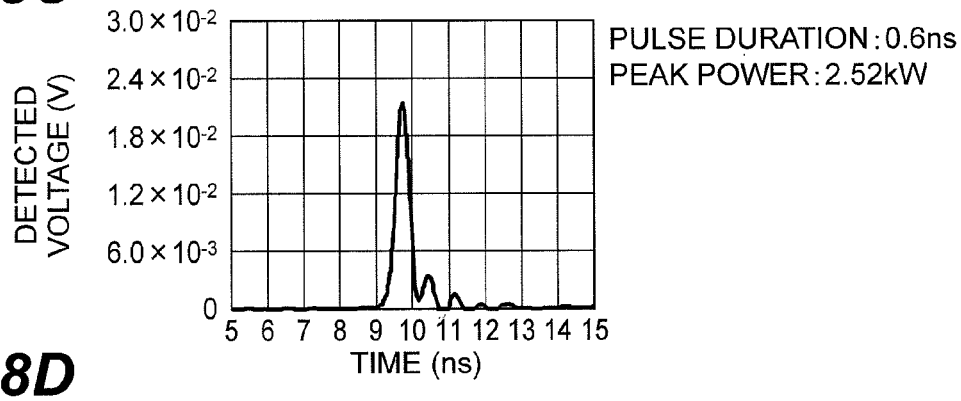
Figure 8D:
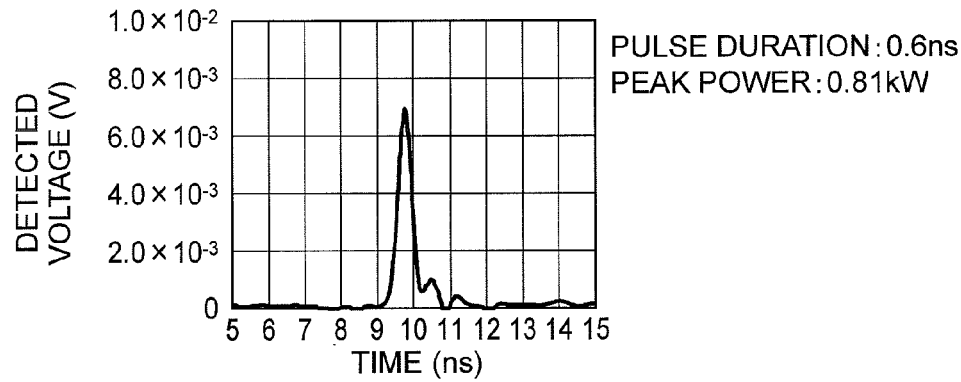
Figure 9A:
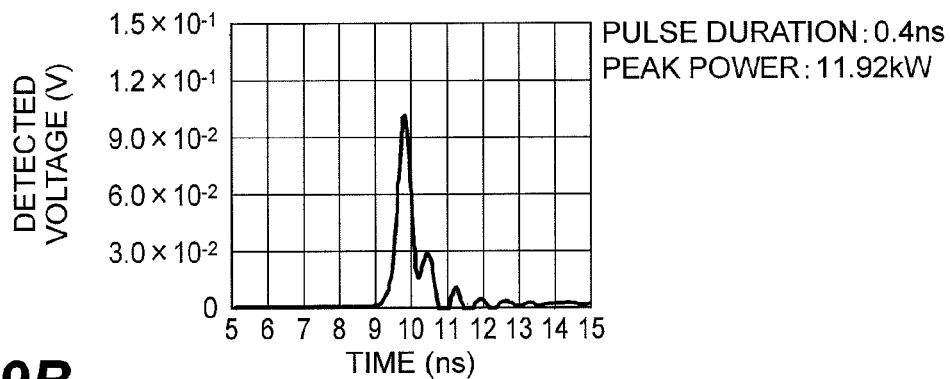
FIGS. 9A to 9D are views each showing a measurement result of a pulse waveform in the case where pulsed light (having a pulse duration of 0.4 to 0.6 ns and a repetition frequency of 500 kHz) is oscillated from the pulsed light source.
Figure 9B:
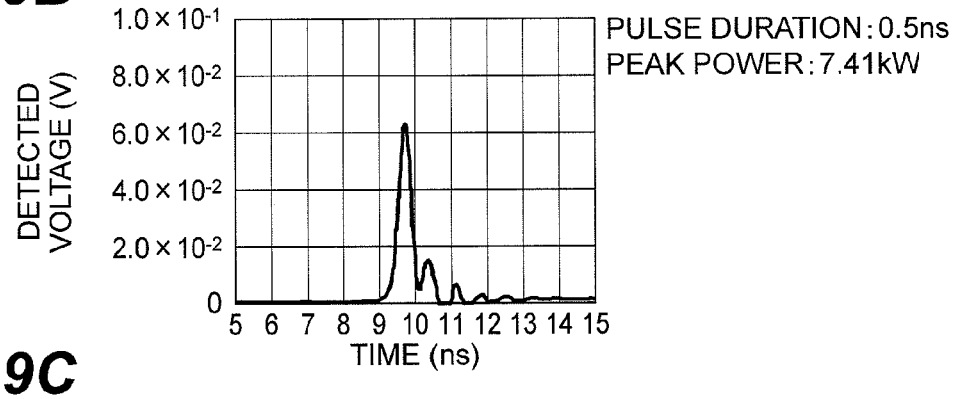
Figure 9C:
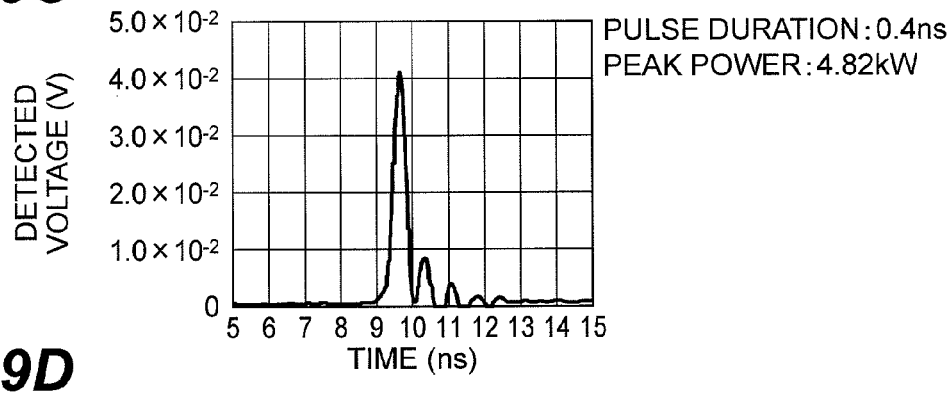
Figure 9D:
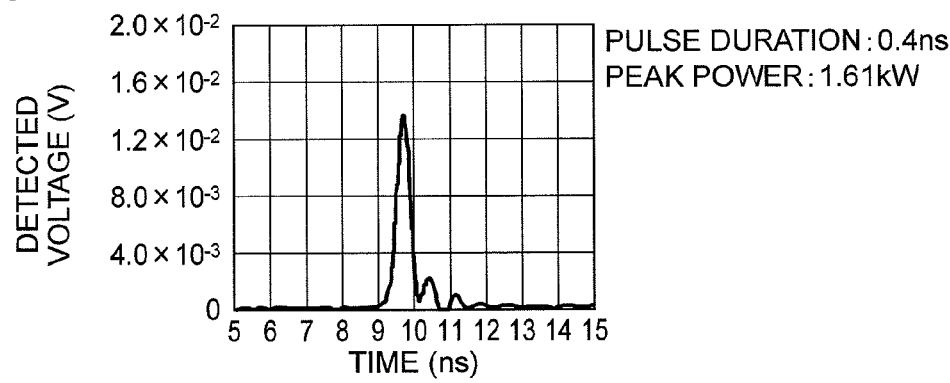
Figure 10A:
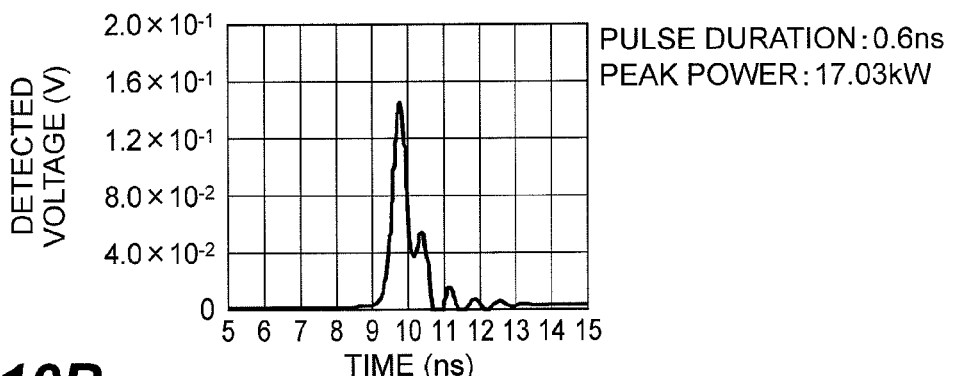
FIGS. 10A to 10D are views each showing a measurement result of a pulse waveform in the case where pulsed light (having a pulse duration of 0.4 to 0.6 ns and a repetition frequency of 250 kHz) is oscillated from the pulsed light source.
Figure 10B:
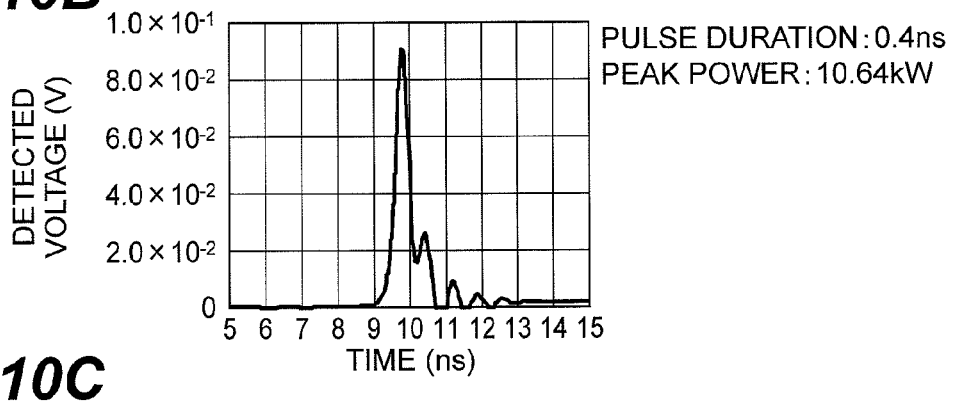
Figure 10C:
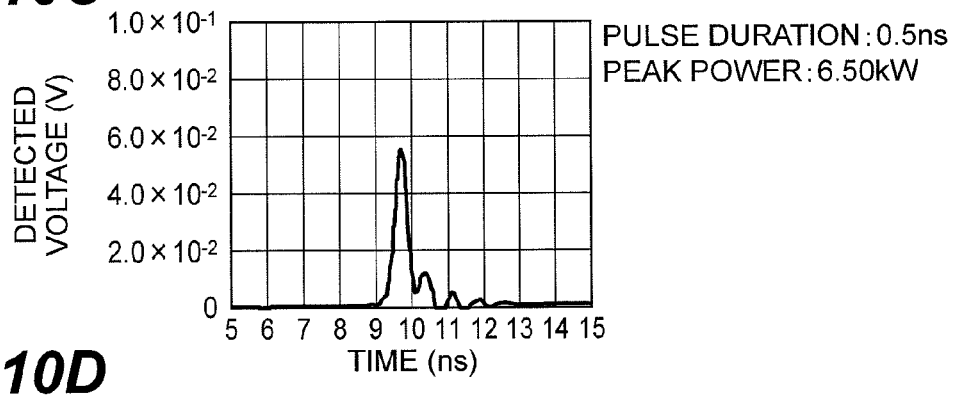
Figure 10D:
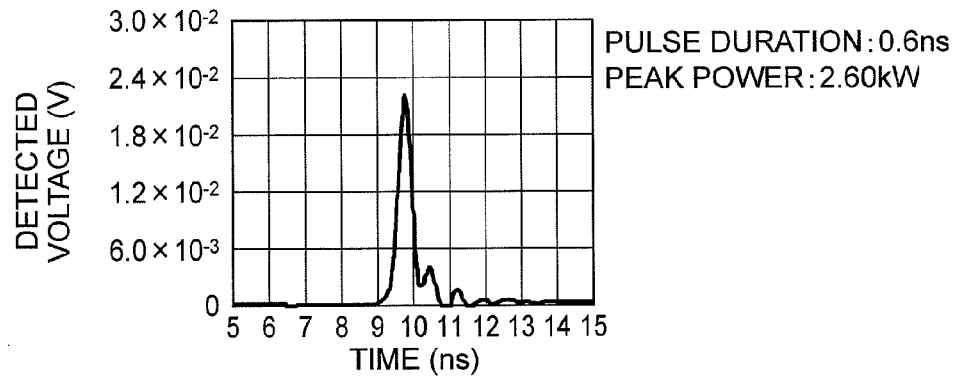
Figure 11A:
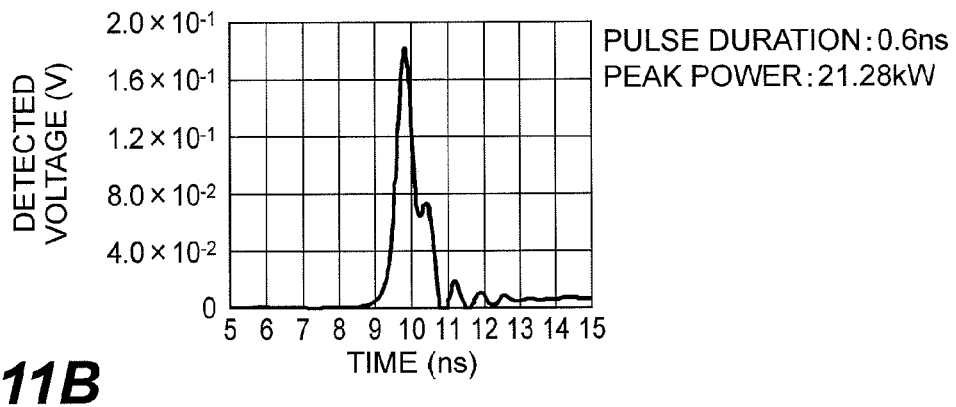
FIGS. 11A to 11D are views each showing a measurement result of a pulse waveform in the case where pulsed light (having a pulse duration of 0.4 to 0.6 ns and a repetition frequency of 100 kHz) is oscillated from the pulsed light source.
Figure 11B:
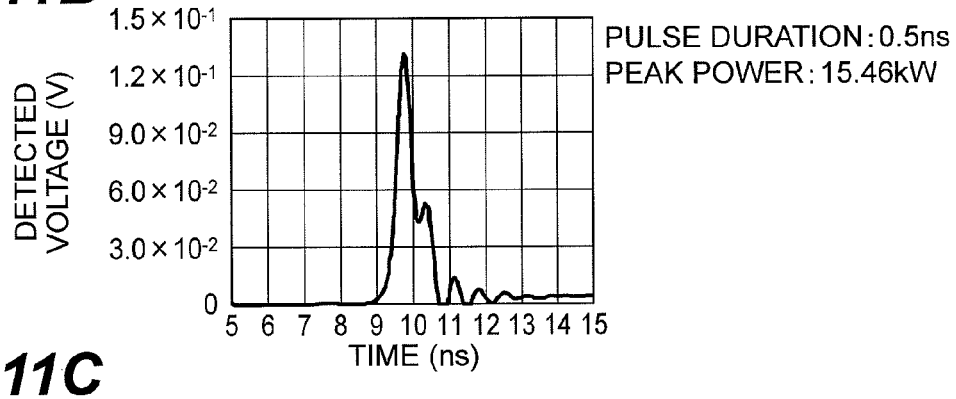
Figure 11C:
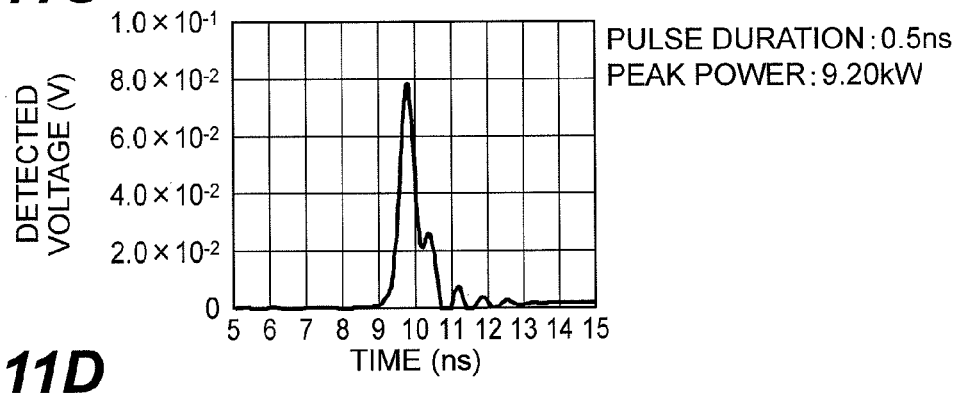
Figure 11D:
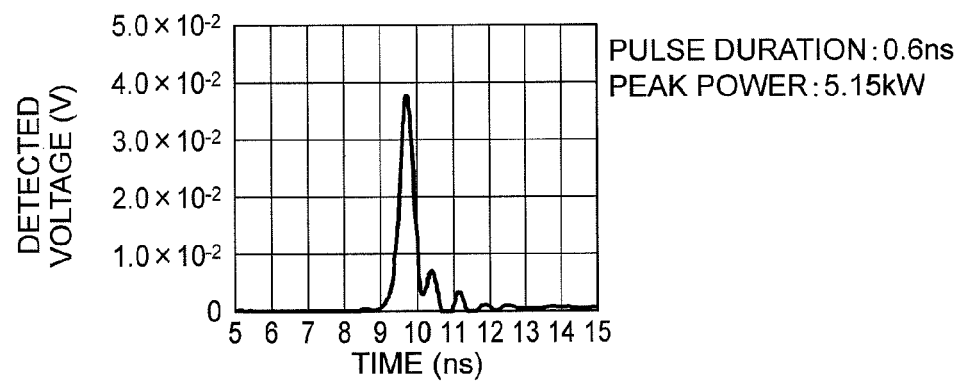

Next, a configuration of the pulsed light source 1 which configures a part of the laser processing apparatus 100 will be described with reference to FIG. 2. Note that FIG. 2 is a view showing a configuration example of the pulsed light source 1 which configures the laser processing apparatus 100 shown in FIG. 1. The pulsed light source 1 shown in FIG. 2 comprises a seed light source 10, a YbDF (Yb-Doped Fiber) 20, a variable band pass filter 30, a YbDF 40, a YbDF 50, and the like, and thereby having a MOPA structure.

The seed light source 10 includes a semiconductor laser which is directly-modulated so as to output the pulsed light. As the semiconductor laser, a Fabry-Perot type semiconductor laser is suitable from a view point of increasing the power, and a view point of avoiding nonlinear effects, such as stimulated Brillouin scattering (SBS). Further, the semiconductor laser outputs the pulsed light with a wavelength near 1060 nm at which YbDFs 20, 40 and 50 serving as amplification optical fibers have a gain. The YbDFs 20, 40 and 50 have a structure in which Yb element is added as an active material to the optical fiber core mainly made of quartz glass. In such configuration, the pumping light wavelength is close to the wavelength of light to be amplified. Thus, the configuration is advantageous from a view point of power conversion efficiency, and is also advantageous from a viewpoint of having a high gain near the wavelength of 1060 nm. The YbDFs 20, 40 and 50 configure an optical fiber amplifier of three stages.

A pumping light outputted from a pumping light source 22 is supplied to the YbDF 20 of the first stage in the forward direction via an optical coupler 21. Then, the YbDF 20 receives and amplifies the pulsed light outputted from the seed light source 10 through an optical isolator 23 and the optical coupler 21, and outputs the amplified pulsed light via an optical isolator 24.

The variable band pass filter 30 receives the pulsed light amplified by the YbDF 20 of the first stage, and attenuates components of one of the short and long wavelength sides of the wavelength band of the received pulsed light more than the components of the other wavelength side. Note that in the laser marking method according to the present embodiment, the pulse duration of the pulsed light is changed by adjusting the variable band pass filter 30. Note that the pulse duration can also be changed by setting beforehand the modulator (not shown) for directly modulating the seed light source 10, or by adjusting the modulator.

A pumping light outputted from a pumping light source 42 is supplied to the YbDF 40 of the second stage in the forward direction via an optical coupler 41. Then, the pulsed light outputted from the variable band pass filter 30 is inputted into the YbDF 40 through an optical isolator 43 and the optical coupler 41. The YbDF 40 amplifies the inputted pulsed light and outputs the amplified pulsed light via an optical isolator 44. The pumping light outputted from respective pumping light sources 52 to 55 are supplied to the YbDF 50 of the third stage in the forward direction via a combiner 51. Also, the pulsed light amplified by the YbDF 40 of the second stage is inputted into the YbDF 50. The YbDF 50 further amplifies the inputted pulsed light and outputs the amplified pulsed light to the outside via an end cap 60.

The pulsed light emitted from the pulsed light source having the above described structure is inputted into the collimator 2 as shown in FIG. 1. The collimator 2 collimates the pulsed light outputted from the pulsed light source 1. Then, the pulsed light outputted from the collimator 2 is inputted into the beam expander 3, and the pulsed light with the expanded beam diameter is outputted from the beam expander 3. The pulse light outputted from the beam expander 3 is inputted into the galvano scanner 4. Then, the pulsed light reflected by the galvano scanner 4 is condensed by the fθ lens 5, so as to reach the surface of the marking object 6.

Note that as a suitable configuration example, the above described laser processing apparatus 100 is configured as follows. The expansion ratio (magnification factor) of the beam diameter expanded by the beam expander 3 is eight. Also, the galvano scanner 4 is configured such that the light irradiation position can be moved relatively to two axes being in parallel to the plane on which the marking object 30 is arranged.

Further, as a suitable configuration example, the pulsed light source 1 shown in FIG. 2 is configured as follows. The YbDF 20 of the first stage is inputted in the forward direction with pumping light which has a pumping wavelength of 975 nm and a fixed power of 200 mW in a core-pumping method. Further, the YbDF 20 to be used has an unsaturated absorption coefficient of 240 dB/m at the wavelength of 975 nm and has a length of 5 m. The YbDF 20 has a core diameter of 7 μm and NA of about 0.12. The YbDF 40 of the second stage is inputted in the forward direction with pumping light which has a pumping wavelength of 975 nm and a fixed power of 200 mW in a core-pumping method. The YbDF 40 to be used has an unsaturated absorption coefficient of 240 dB/m at the wavelength of 975 nm and has a length of 8 m. The YbDF 40 has a core diameter of 6 μm and NA of about 0.12. The YbDF 50 of the third stage is inputted in the forward direction with pumping light which have a pumping wavelength of 975 nm and a total power of 20 W (four pumping LEDs of 5 W class) in a cladding-pumping method. The YbDF 50 to be used has an unsaturated absorption coefficient of 1200 dB/m at the core portion and has a length of 5 m. The YbDF 50 has a core diameter of 10 μm and NA of about 0.06. The inner cladding of the YbDF 50 has a diameter of 125 μm and NA of about 0.46.

Here, FIGS. 3A and 3B are views each showing a beam cross section in the case where the pulsed light is emitted from the pulsed light source 1 having the above described configuration. FIG. 3A is a view showing a beam cross section of pulsed light with a pulse duration of 10 ns as an example in the case of the pulse duration of 9 to 12 ns. FIG. 3B is a view showing a beam cross section of the pulsed light with a pulse duration of 0.6 ns as an example in the case of the pulse duration of 0.4 to 0.6 ns. In the beam diameter of pulsed light (having the pulse duration of 10 ns) shown in FIG. 3A, the size in the x direction (lateral direction in FIG. 3A) is 619.75 μm, and the size in the y direction (longitudinal direction in FIG. 3A) is 626.45 μm, so that the ratio of x/y is 0.99. On the other hand, in the beam diameter of the pulsed light (having the pulse duration of 0.6 ns) shown in FIG. 3B, the size in the x direction (lateral direction in FIG. 3B) is 710.20 μm, and the size in the y direction (longitudinal direction in FIG. 3A) is 680.05 μm, so that the ratio of x/y is 1.04.

FIGS. 4A to 11D are views each showing a measurement result of a pulse waveform in the case where pulsed light is oscillated from the pulsed light source 1.

In particular, FIGS. 4A to 4D are views each showing a measurement result of a pulse waveform in the case where pulsed light (having a pulse duration of 9 to 12 ns and a repetition frequency of 1 MHz) is oscillated from the pulsed light source. FIGS. 5A to 5D are views each showing a measurement result of a pulse waveform in the case where pulsed light (having a pulse duration of 9 to 12 ns and a repetition frequency of 500 kHz) is oscillated from the pulsed light source. FIGS. 6A to 6D are views each showing a measurement result of a pulse waveform in the case where a pulsed light (having a pulse duration of 9 to 12 ns and a repetition frequency of 250 kHz) is oscillated from the pulsed light source. FIGS. 7A to 7D are views each showing a measurement result of a pulse waveform in the case where a pulsed light (having a pulse duration of 9 to 12 ns and a repetition frequency of 100 kHz) is oscillated from the pulsed light source. FIGS. 8A to 8D are views each showing a measurement result of a pulse waveform in the case where pulsed light (having a pulse duration of 0.4 to 0.6 ns and a repetition frequency of 1 MHz) is oscillated from the pulsed light source. FIGS. 9A to 9D are views each showing a measurement result of a pulse waveform in the case where pulsed light (having a pulse duration of 0.4 to 0.6 ns and a repetition frequency of 500 kHz) is oscillated from the pulsed light source. FIGS. 10A to 10D are views each showing a measurement result of a pulse waveform in the case where pulsed light (having a pulse duration of 0.4 to 0.6 ns and a repetition frequency of 250 kHz) is oscillated from the pulsed light source. FIGS. 11A to 11D are views each showing a measurement result of a pulse waveform in the case where pulsed light (having a pulse duration of 0.4 to 0.6 ns and a repetition frequency of 100 kHz) is oscillated from the pulsed light source.

Further, each of FIGS. 4A, 5A, 6A, 7A, 8A, 9A, 10A and 11A shows a measurement result of a pulse waveform having an average output power of 10 W. Each of FIGS. 4B, 5B, 6B, 7B, 8B, 9B, 10B and 11B shows a measurement result of a pulse waveform having an average output power of 5.0 W. Each of FIGS. 4C, 5C, 6C, 7C, 8C, 9C, 10C and 11C shows a measurement result of a pulse waveform having an average output power of 2.5 W. Each of FIGS. 4D, 5D, 6D, 7D, 8D, 9D, 10D and 11D shows a measurement result of a pulse waveform having an average output power of 1.0 W.

As shown in FIGS. 4A to 11D, it can be confirmed that in the case where the pulse duration is changed without changing the average output power and the repetition frequency (the case corresponding, for example, to the conditions in FIG. 4A and FIG. 8A), a pulsed light having a large peak power is outputted by reducing the pulse duration.

FIGS. 12A to 19C are views each showing a processed surface of the marking object 6 in the case where laser marking is performed by irradiating the marking object 6 with a pulsed light by using the laser processing apparatus 100. Note that a black polycarbonate plate material having a thickness of 3 mm is used as the marking object 6, and the relative moving speed of the pulsed light with respect to the marking object 6 is changed by changing the sweep speed of the galvano scanner 4.

Figure 12A:
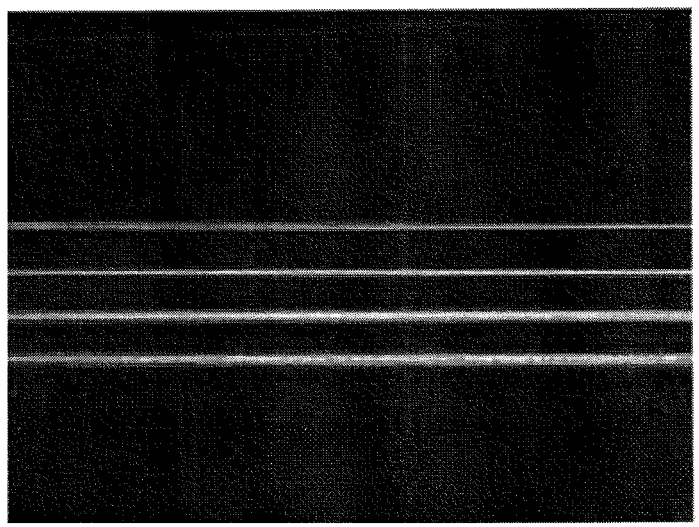
FIGS. 12A to 12C are views each showing a processed surface of a marking object in the case of the laser marking in which the marking object is irradiated with pulsed light (having a pulse duration of 9 to 12 ns and a repetition frequency of 1 MHz) by using the laser processing apparatus shown in FIG. 1.
Figure 12B:
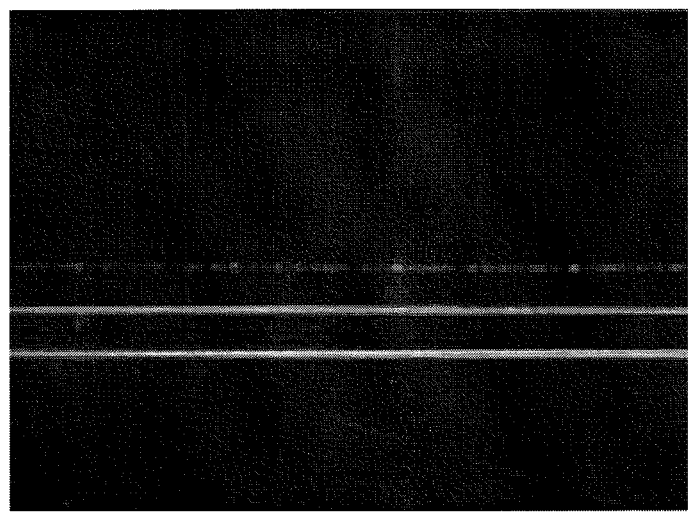
Figure 12C:
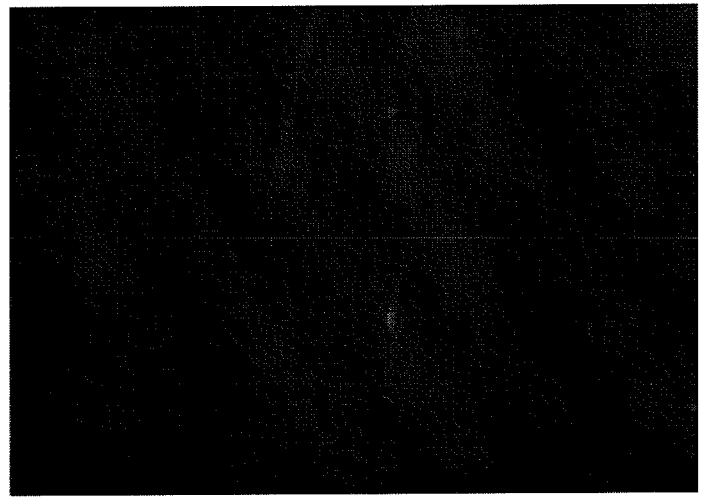
Figure 13A:
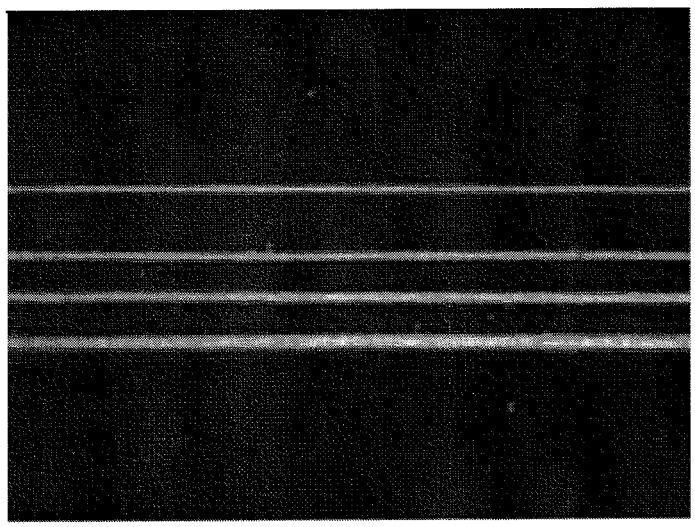
FIGS. 13A to 13C are views each showing a processed surface of a marking object in the case of the laser marking in which the marking object is irradiated with pulsed light (having a pulse duration of 9 to 12 ns and a repetition frequency of 500 kHz) by using the laser processing apparatus shown in FIG. 1.
Figure 13B:
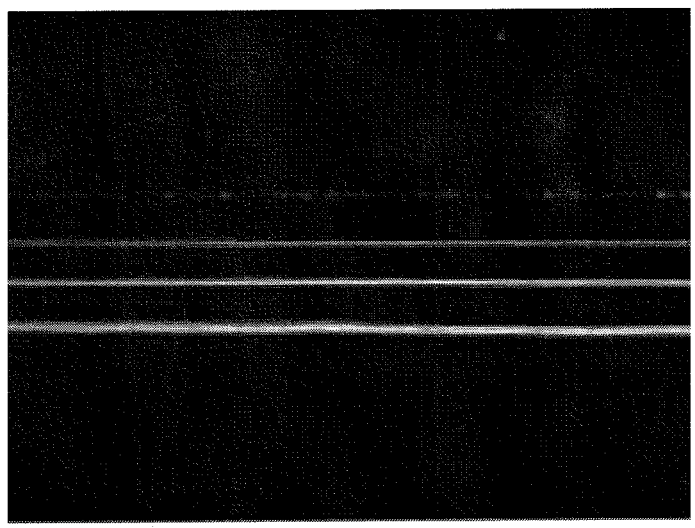
Figure 13C:
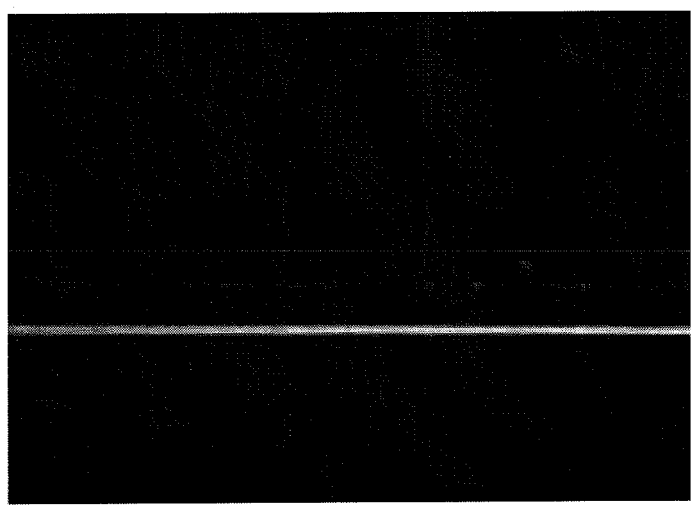
Figure 14A:
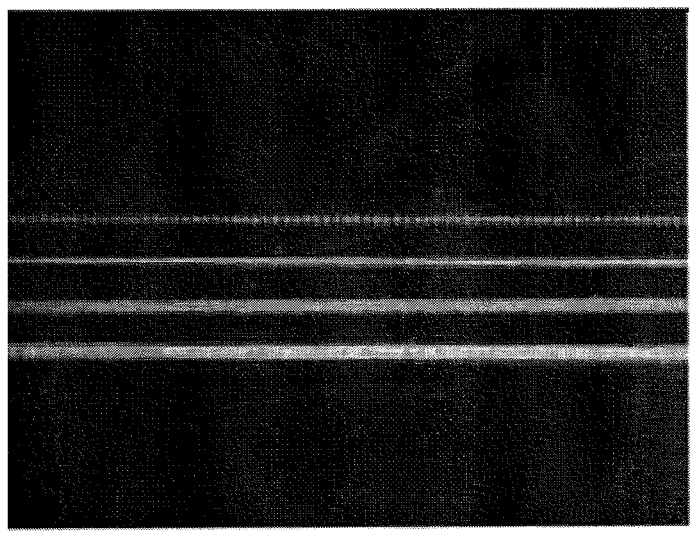
FIGS. 14A to 14C are views each showing a processed surface of a marking object in the case of the laser marking in which the marking object is irradiated with pulsed light (having a pulse duration of 9 to 12 ns and a repetition frequency of 250 kHz) by using the laser processing apparatus shown in FIG. 1.
Figure 14B:
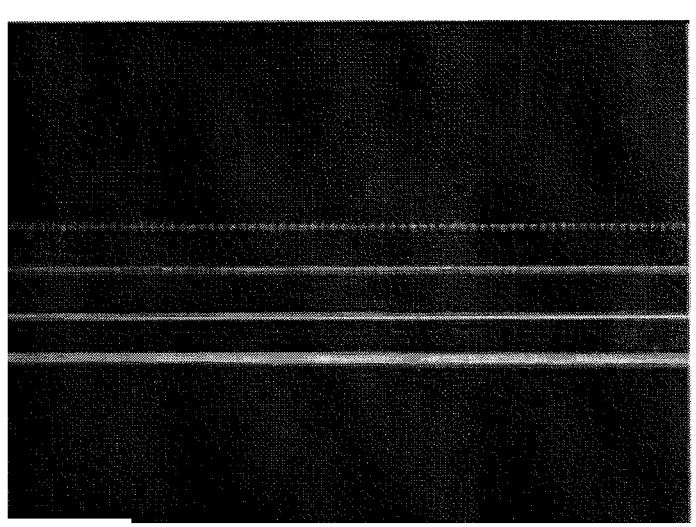
Figure 14C:
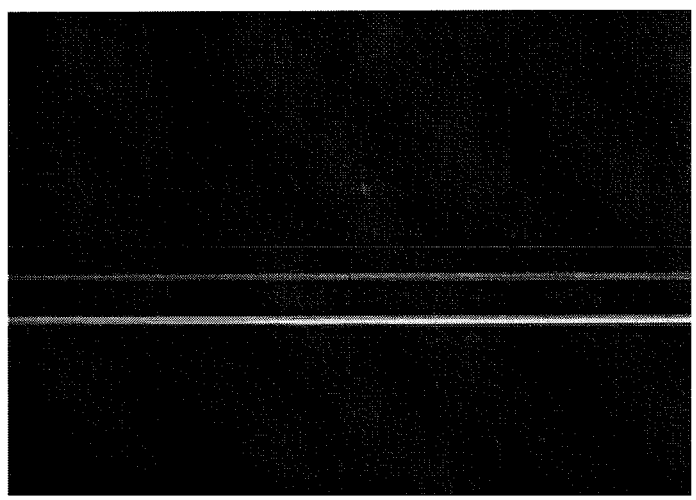
Figure 15A:
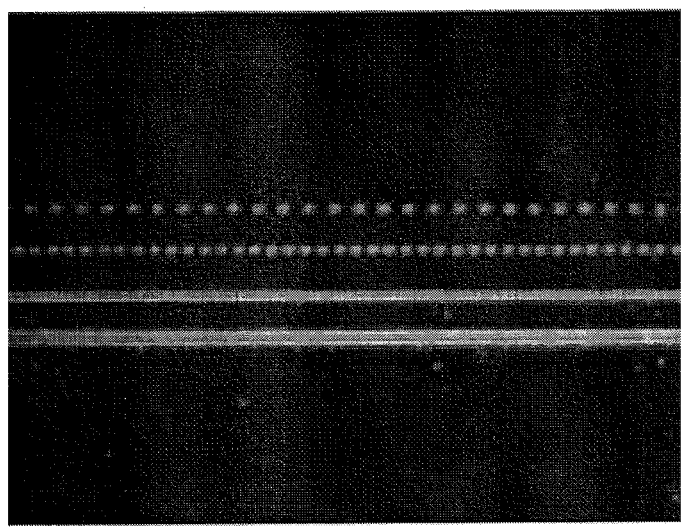
FIGS. 15A to 15C are views each showing a processed surface of a marking object in the case of the laser marking in which the marking object is irradiated with pulsed light (having a pulse duration of 9 to 12 ns and a repetition frequency of 100 kHz) by using the laser processing apparatus shown in FIG. 1.
Figure 15B:
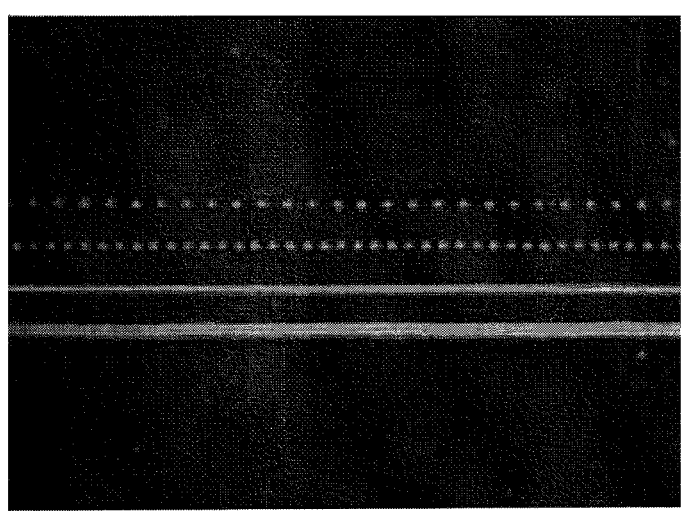
Figure 15C:
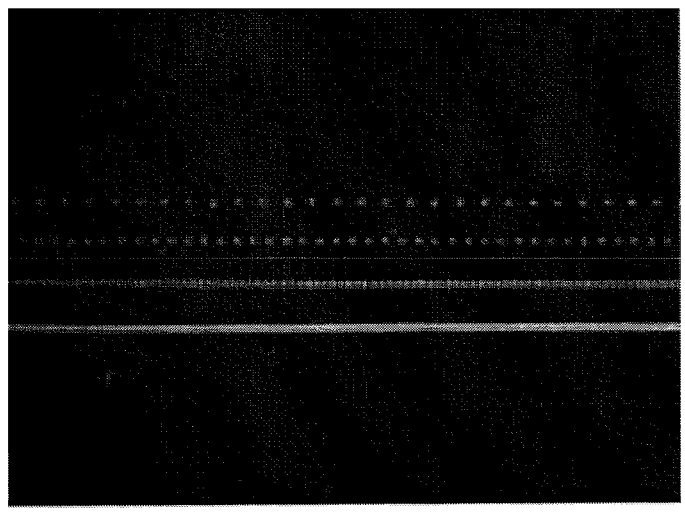
Figure 16A:
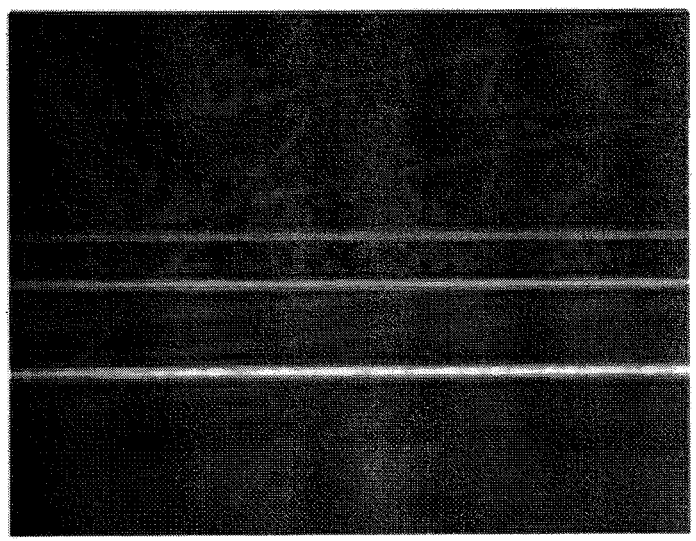
FIGS. 16A to 16C are views each showing a processed surface of a marking object in the case of the laser marking in which the marking object is irradiated with pulsed light (having a pulse duration of 0.4 to 0.6 ns and a repetition frequency of 1 MHz) by using the laser processing apparatus shown in FIG. 1.
Figure 16B:
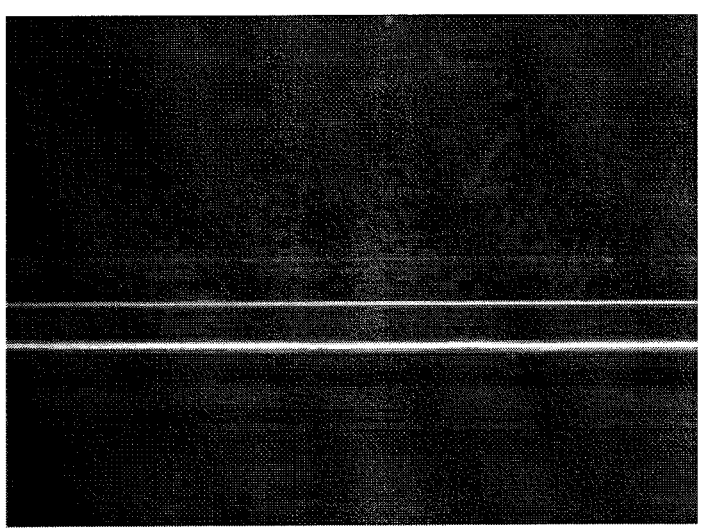
Figure 16C:
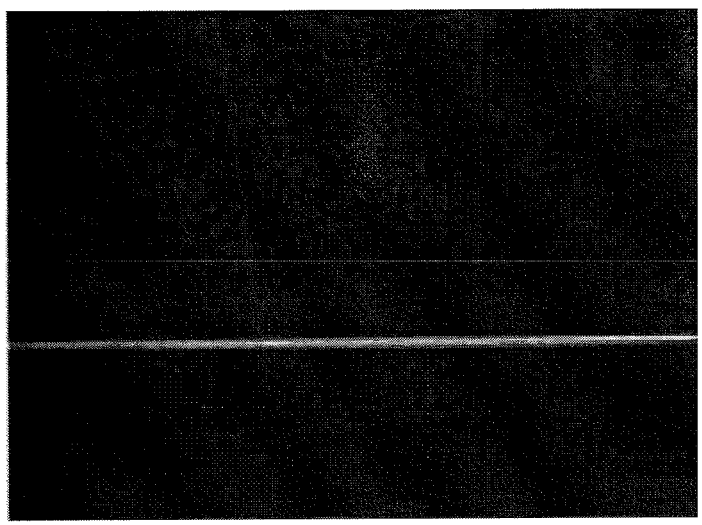
Figure 17A:
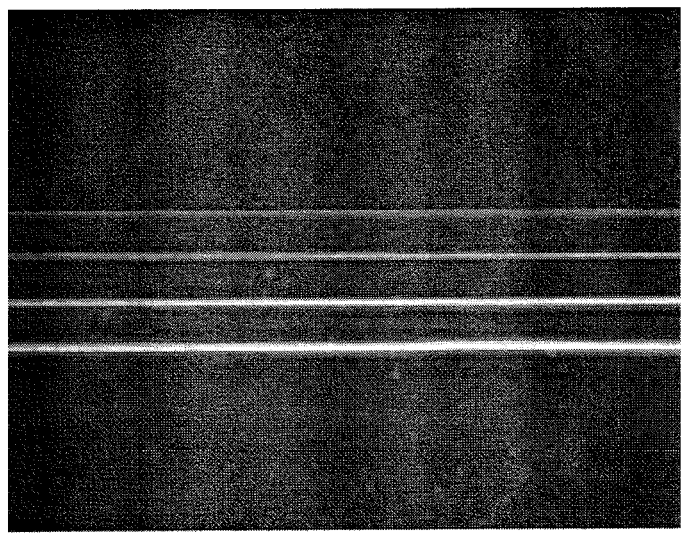
FIGS. 17A to 17C are views each showing a processed surface of a marking object in the case of the laser marking in which the marking object is irradiated with pulsed light (having a pulse duration of 0.4 to 0.6 ns and a repetition frequency of 500 kHz) by using the laser processing apparatus shown in FIG. 1.
Figure 17B:
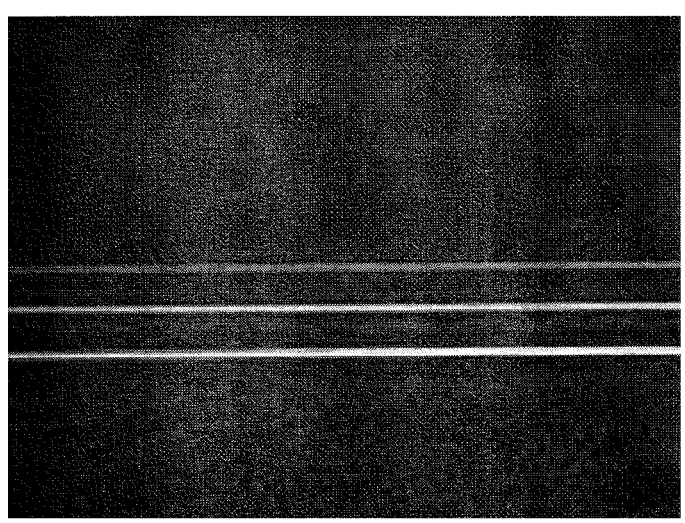
Figure 17C:
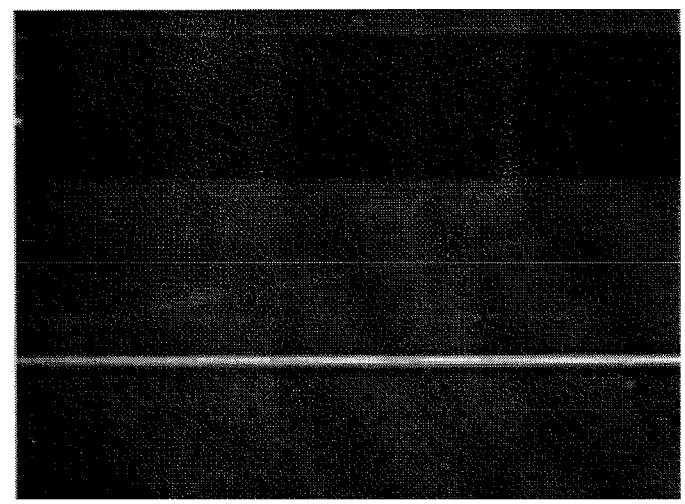
Figure 18A:
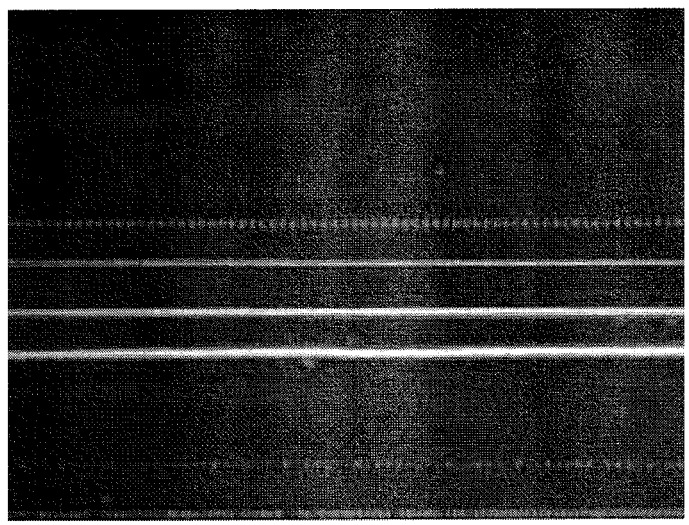
FIGS. 18A to 18C are views each showing a processed surface of a marking object in the case of the laser marking in which the marking object is irradiated with pulsed light (having a pulse duration of 0.4 to 0.6 ns and a repetition frequency of 250 kHz) by using the laser processing apparatus shown in FIG. 1.
Figure 18B:
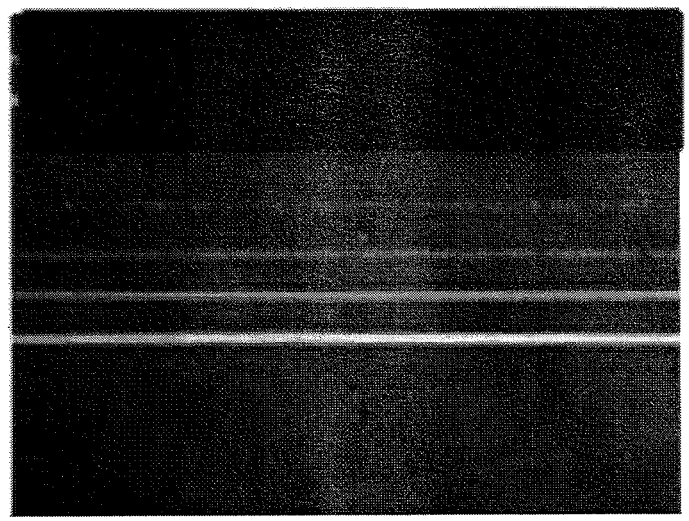
Figure 18C:
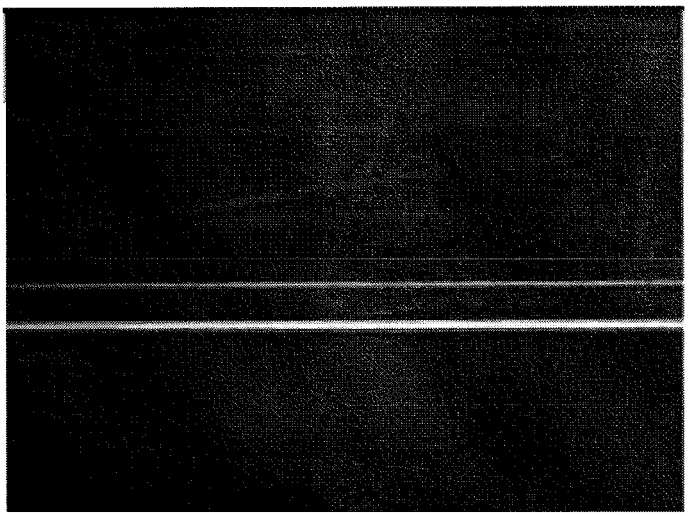
Figure 19A:
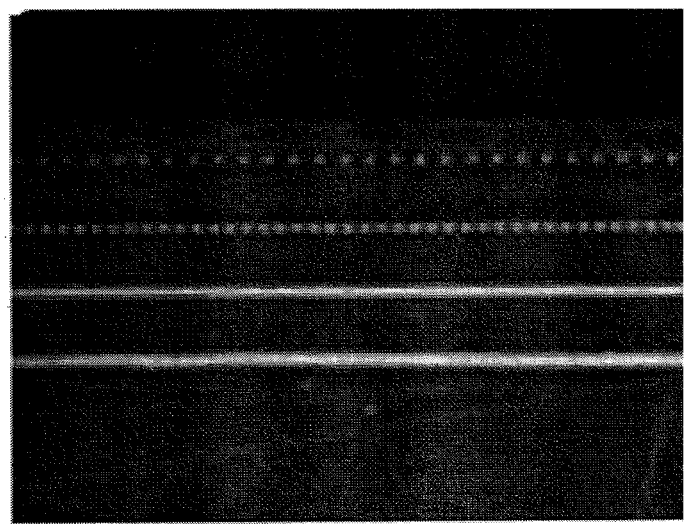
FIGS. 19A to 19C are views each showing a processed surface of a marking object in the case of the laser marking in which the marking object is irradiated with pulsed light (having a pulse duration of 0.4 to 0.6 ns and a repetition frequency of 100 kHz) by using the laser processing apparatus shown in FIG. 1.
Figure 19B:
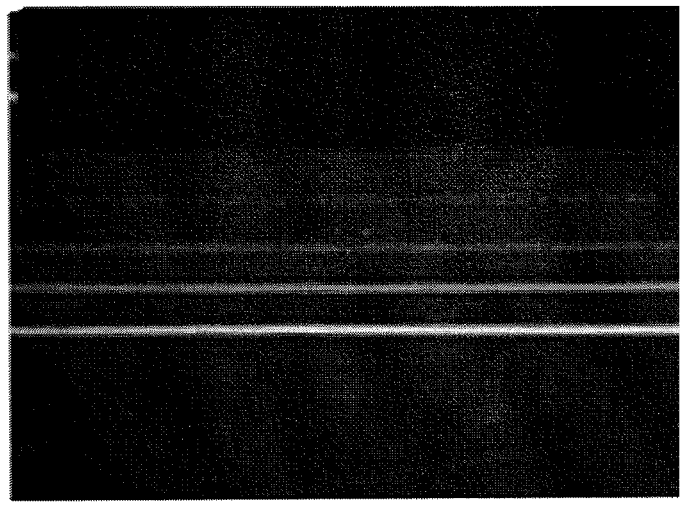
Figure 19C:
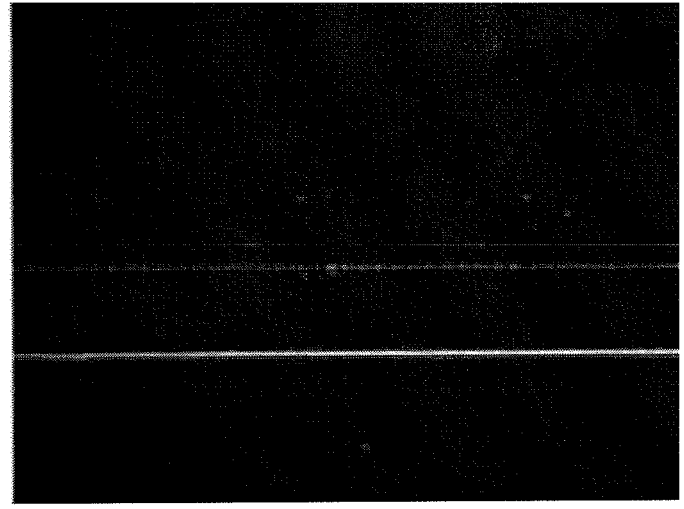

In particular, FIGS. 12A to 12C are views each showing a processed surface of the marking object in the case where laser marking is performed by irradiating the marking object with pulsed light (having a pulse duration of 9 to 12 ns and a repetition frequency of 1 MHz) by using the laser processing apparatus shown in FIG. 1. FIGS. 13A to 13C are views each showing a processed surface of the marking object in the case where laser marking is performed by irradiating the marking object with pulsed light (having a pulse duration of 9 to 12 ns and a repetition frequency of 500 kHz) by using the laser processing apparatus shown in FIG. 1. FIGS. 14A to 14C are views each showing a processed surface of the marking object in the case where laser marking is performed by irradiating the marking object with pulsed light (having a pulse duration of 9 to 12 ns and a repetition frequency of 250 kHz) by using the laser processing apparatus shown in FIG. 1. FIGS. 15A to 15C are views each showing a processed surface of the marking object in the case where laser marking is performed by irradiating the marking object with pulsed light (having a pulse duration of 9 to 12 ns and a repetition frequency of 100 kHz) by using the laser processing apparatus shown in FIG. 1. FIGS. 16A to 16C are views each showing a processed surface of the marking object in the case where laser marking is performed by irradiating the marking object with pulsed light (having a pulse duration of 0.4 to 0.6 ns and a repetition frequency of 1 MHz) by using the laser processing apparatus shown in FIG. 1. FIGS. 17A to 17C are views each showing a processed surface of the marking object in the case where laser marking is performed by irradiating the marking object with pulsed light (having a pulse duration of 0.4 to 0.6 ns and a repetition frequency of 500 kHz) by using the laser processing apparatus shown in FIG. 1. FIGS. 18A to 18C are views each showing a processed surface of the marking object in the case where laser marking is performed by irradiating the marking object with pulsed light (having a pulse duration of 0.4 to 0.6 ns and a repetition frequency of 250 kHz) by using the laser processing apparatus shown in FIG. 1. FIGS. 19A to 19C are views each showing a processed surface of the marking object in the case where laser marking is performed by irradiating the marking object with pulsed light (having a pulse duration of 0.4 to 0.6 ns and a repetition frequency of 100 kHz) by using the laser processing apparatus shown in FIG. 1.

In each of FIGS. 12A, 13A, 14A, 15A, 16A, 17A, 18A and 19A, the average output power of the irradiated pulsed light is 10 W. In each of FIGS. 12B, 13B, 14B, 15B, 16B, 17B, 18B and 19B, the average output power of the irradiated pulsed light is 5.0 W. In each of FIGS. 12C, 13C, 14C, 15C, 16C, 17C, 18C and 19C, the average output power of the irradiated pulsed light is 2.5 W.

When the average output power of the pulsed light was set to 1.0 W, the output power was insufficient and hence the surface of the marking object could not be processed. Further, each of FIG. 12A to 19C shows the processed surface in the case where the marking speed (processing speed) was changed in four stages. The marking speed of the pulsed light was set to 11400 mm/s, 5700 mm/s, 2850 mm/s and 1140 mm/s in order from the top stage in each of FIGS. 12A to 19C, and at the each marking speed, the marking processing was performed only by one-way irradiation of the pulsed light.

As a result, by comparing FIGS. 12A to 15C (in the cases of the pulse duration of 9 to 12 ns) with FIGS. 16A to 19C (in the cases of the pulse duration of 0.4 to 0.6 ns), it was confirmed that a deeper marking pattern can be formed by reducing the pulse duration. Specifically, under the conditions of the marking speed of 1140 mm/s, the average output power of 2.5 W, and the repetition frequency of 1 MHz, the marking pattern could not be visually recognized in the case of the pulse duration of 9 to 12 ns (FIG. 12C), but the marking pattern could be sufficiently visually recognized in the case of the pulse duration of 0.4 to 0.6 ns (FIG. 16C). In this way, it was confirmed that the gray level of the marking pattern can be changed by changing the pulse duration.

Figure 20:
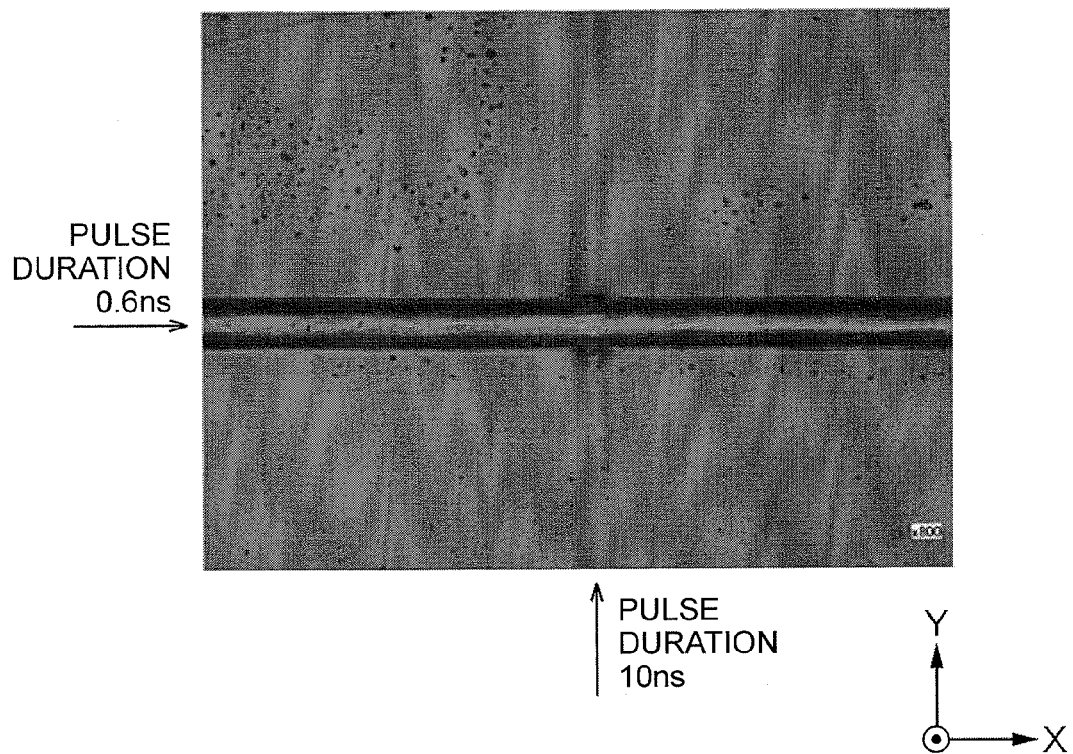
FIG. 20 is a view for explaining changes in the gray level of marking patterns in the case where the pulse duration is changed under the conditions of the laser marking processing speed of 1140 mm/s, the pulse light average output power of 2.5 W, and the pulse light repetition frequency of 1 MHz.

FIG. 20 is a view for explaining changes in the gray level of marking patterns in the case where the pulse duration is changed under the conditions of the marking processing speed of 1140 mm/s, the average output power of 2.5 W, and the repetition frequency of 1 MHz. Note that in the example shown in FIG. 20, the surface of polycarbonate plate material (marking object 6) is processed in the X-axis direction in the case where the pulse duration is set to 0.6 ns under the above described conditions, and the surface of polycarbonate plate material is also processed in the Y-axis direction under the same conditions as those in the case of the pulse duration of 0.6 ns except that other pulse duration is set to 10 ns. As shown in FIG. 20, the marking pattern extended in the X-axis direction on the surface of the polycarbonate plate material (in the case of the pulse duration of 0.6 ns) was formed into a marking pattern having a width of 27 µm and a high coloring density, while in the marking pattern extended in the Y-axis direction (in the case of the pulse duration of 10 ns), processing traces could be confirmed, but the coloring density in the marking pattern was low as compared with the processing trace in the X-axis direction. In this way, it was confirmed from the above described examples that the grey level of the marking pattern can be changed by changing the pulse duration.

In the following, there will be described specific examples of a method of changing the grey level of a marking pattern which is formed on a marking object by using the above described laser marking method.

Figure 21:
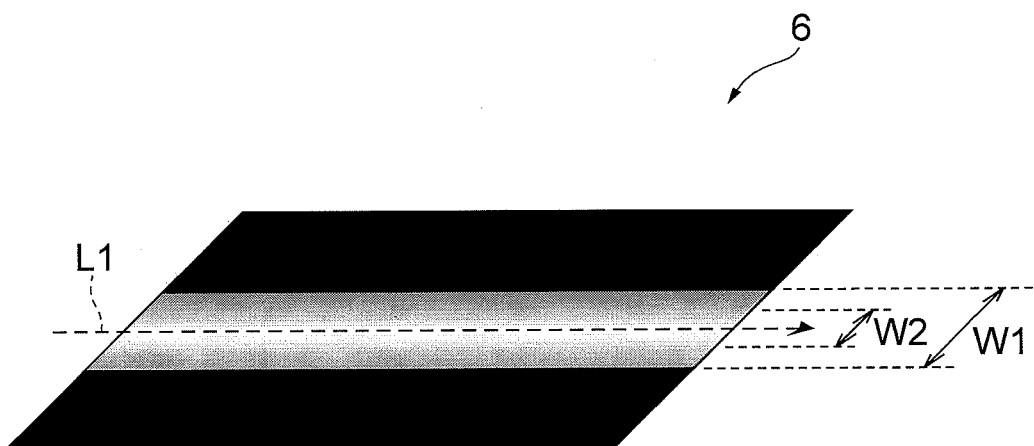
FIG. 21 is a view for explaining a first processing example in which the laser marking method according to the present embodiment is used.

FIG. 21 is a view for explaining a first processing example in which the laser marking method according to the present embodiment is used. In the first processing example, pulsed light with a first pulse duration (for example, 1 ns or less) is irradiated on the surface of the marking object 6 along a line L1 (the first marking processing). At this time, a marking pattern having a width W1 is formed. Subsequently, pulsed light with a second pulse duration (for example, 10 ns) is irradiated on the surface of the marking object 6 along the same line as the line L1 in the case of the first marking processing performed by using the pulsed light having the first pulse duration (the second marking processing). At this time, a marking pattern having a width W2 is formed. When the first and second marking processing is performed, a higher density marking pattern is formed by two times of the marking processing in the area having the width W2 on both sides of the line L1, while the area which is on the outside of the area having the width W2, and which is subjected to the first marking processing using the pulsed light of the first pulse duration, has a marking pattern of low coloring density which is formed only by the first marking processing using the pulsed light having the first pulse duration. In this way, it is possible to form a linear marking pattern having a grey level variation by performing the marking processing using pulsed light having a different pulse duration on the same line.

Figure 22:
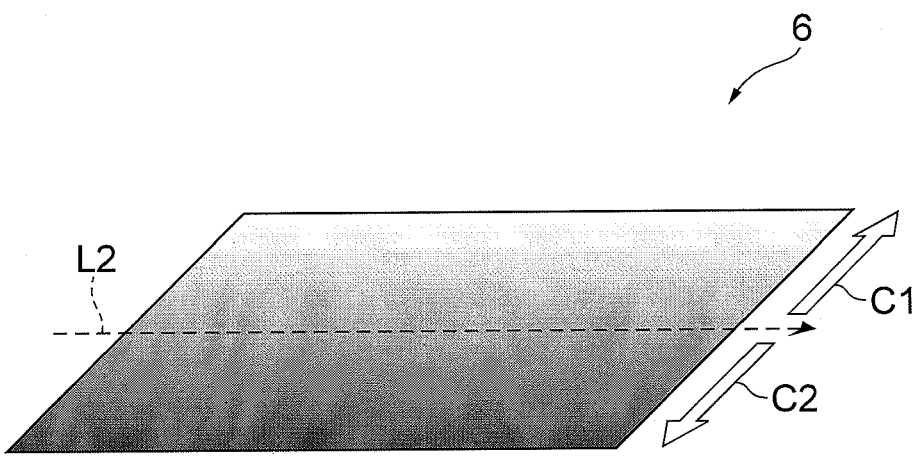
FIG. 22 is a view for explaining a second processing example in which the laser marking method according to the present embodiment is used.

FIG. 22 is a view for explaining a second processing example in which the laser marking method according to the present embodiment is used. In the second processing example, marking processing is performed by irradiating pulsed light with a first pulse duration on the surface of the marking object 6 along a line L2. Subsequently, marking processing is performed by irradiating pulsed light with a second pulse duration shorter than the first pulse duration at positions slightly shifted in the C1 direction from the line L2. Further, marking processing is performed by irradiating pulsed light with a third pulse duration shorter than the second pulse duration at positions further shifted in the C1 direction from the marking formed by the pulsed light having the second pulse duration. By irradiating the pulsed light components with shorter pulse durations toward the C1 direction in this way, a marking pattern having a higher density toward the C1 direction is formed. On the contrary, a marking pattern whose density is reduced from the line L2 toward the C2 direction is formed in such a manner that marking processing is performed by irradiating pulsed light with a fourth pulse duration longer than the first pulse duration on the surface of the marking object 6 at positions shifted in the C2 direction from the line L2, and then that by using pulsed light with a fifth pulse duration longer than the fourth pulse duration, marking processing is performed at positions further shifted in the C2 direction from the marking pattern formed by the pulsed light having the fourth pulse duration. When the marking processing is performed by gradually changing the pulse duration in this way, it is possible to form a marking pattern having grey level variations on the surface of the processing object.

Figure 23:
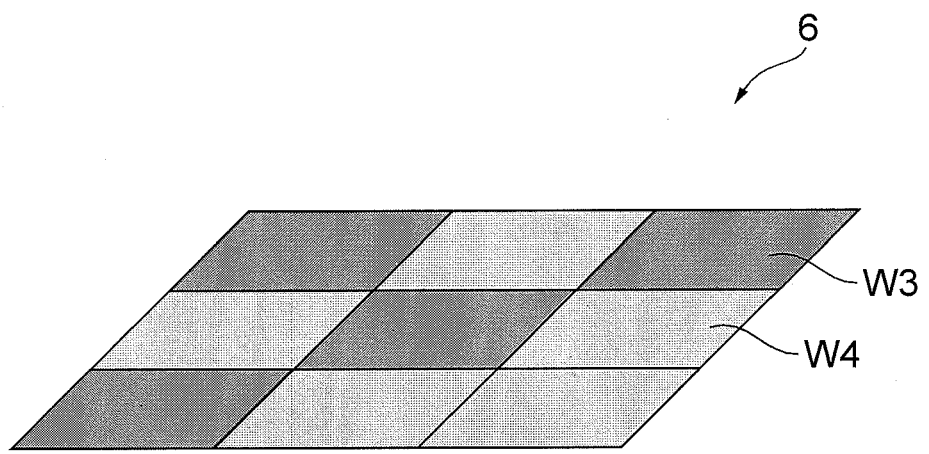
FIG. 23 is a view for explaining a third processing example in which the laser marking method according to the present embodiment is used.

FIG. 23 is a view for explaining a third processing example in which the laser marking method according to the present embodiment is used. In the third processing example, a making area W3 is formed by pulsed light with a first pulse duration, in such a manner that marking processing using the pulsed light having the first pulse duration is linearly performed on the surface of the marking object 6 a plurality of times. Then, a making area W4 is formed by pulsed light with a second pulse duration different from the first pulse duration, in such a manner that marking processing using the pulsed light having the second pulse duration is linearly performed in an area different from the marking area W3 a plurality of times. Since a grey level difference is caused between the marking pattern formed by the pulsed light having the first pulse duration and the marking pattern formed by the pulsed light having the second pulse duration, it is possible to perform marking processing in which the grey level is different between the making area W3 and the making area W4. Thereby, the marking processing with different grey levels for respective areas is performed on the surface of the marking object.

In this way, according to the laser marking method of the present embodiment, the grey level of a marking pattern to be formed on a marking object can be changed by changing the pulse duration of pulsed light without changing the marking speed, the average output power, and the repetition frequency. Further, the grey level of a marking pattern can be easily changed in this way, and hence various kinds of processing can be easily performed by using the grey level variations of the marking.

Further, by using the pulsed light source of the MOPA structure, it is possible to realize the laser marking with higher speed as compared with the laser marking based on a conventional pulsed light source using Q-switching means. Specifically, the conventional pulsed light source using the Q-switching means has problems that the maximum frequency is about 250 kHz, and that with the increase in the frequency, the average output power is reduced and the pulse duration is increased. Further, there is also a problem that when the repetition frequency is increased higher than a constant value, the marking processing cannot be performed due to the decrease in the peak power of the pulsed light. Therefore, the maximum speed of the laser marking, which is determined in dependence upon the repetition frequency and the average output power, is about 2000 mm/s in the case where the Q-switching means is used. On the other hand, in the laser processing apparatus 100 which has the pulsed light source of the MOPA structure, and which is shown in FIG. 1, the maximum frequency of the pulsed light source is increased to about 1 MHz, and thereby it is possible to perform the marking processing even in the case where the processing speed is 2000 mm/s or more (FIG. 12A to 19C). Therefore, the laser processing apparatus 100 is capable of performing the laser marking at higher speed as compared with the laser processing apparatus using the conventional pulsed light source using the Q-switching means.

Further, in the laser marking method according to the present embodiment, a marking pattern having a higher grey level can be formed by changing the pulse duration. For this reason, a marking pattern having the same grey level can be formed at lower output power as compared with the conventional laser marking method. Further, the seed light source of the MOPA structure is capable of easily changing the pulse duration and the repetition frequency as compared with the Q-switching means, and hence makes it possible to easily perform the marking processing which is performed while the settings of marking patterns having different grey levels, and the like, are precisely changed.

In the above, the preferred embodiment according to the present invention is described, but the present invention is not limited to the above described embodiment, and various modifications are possible.

In accordance with the laser marking method of the present invention as described above, it is possible to arbitrarily adjust the grey level of a marking pattern formed on a marking object even in the case of a high processing speed.

What is claimed is:

1. A laser marking method of forming a marking pattern on a marking object by irradiating the marking object with pulses repeatedly outputted from a pulsed light source so that each spot size of the outputted pulses corresponds to one of dots constituting the marking pattern, comprising:

preparing the pulsed light source of a master oscillator and power amplifier structure in which a semiconductor laser outputting for the pulses is used as a seed light source, repeatedly emitting first pulses each having a first pulse duration from the pulsed light source;

sweeping the first pulses and irradiating a first region with the first pulses, the first region being a first marking region on the marking object;

repeatedly emitting second pulses each having a second pulse duration from the pulsed light source, the second pulse duration being different from the first pulse duration; and sweeping the second pulses and irradiating a second region with the second pulses, the second region being a second marking region on the marking object, wherein the first and second pulse durations are changed in correspondence with a repetition frequency of the pulses outputted from the pulsed light source.

2. The laser marking method according to claim 1, wherein the marking pattern is formed on a surface of the marking object in such a manner that a linear shape is formed on the surface of the marking object by performing processing using the first pulses, and that on the line which is formed on the surface of the marking object by the processing using the first pulses, processing is further performed by the second pulses.

3. The laser marking method according to claim 1, wherein the marking pattern is formed on a surface of the marking object in such a manner that a linear shape is formed on the surface of the marking object by performing processing using the first pulses, and that the vicinity of the line, which is formed on the surface of the marking object by the processing using the first pulses, is further processed by the second pulses.

4. The laser marking method according to claim 1, wherein the first marking region is created on a surface of the marking object by performing a plurality times of linear processing using the first pulses, and the second marking region is further created by performing a plurality of times of linear processing using the second pulses with respect to an area on the surface of the marking object, which area is different from the first marking region, whereby a two-dimensional pattern is created as the marking pattern on the surface of the marking object.

5. The laser marking method according to claim 1, wherein the first pulsed duration change is performed in correspondence with a combination of a relative moving speed of the first pulses with respect to the marking object and the repetition frequency of the first pulses.

6. The laser marking method according to claim 1, further comprising condensing each of the first pulses after sweeping the first pulses and before irradiating the first pulses.

7. The laser marking method according to claim 1, wherein the pulsed light source is directly-modulated.

8. The laser marking method according to claim 1, wherein at least a part of the second marking region overlaps the first marking region.

* * * * *